Feb. 10, 1959   S. D. VIGREN ET AL   2,873,322
AUTOMATIC SERVICE CONTROL SYSTEM WITH FAULT RECORDING
Filed Dec. 28, 1954   19 Sheets-Sheet 4

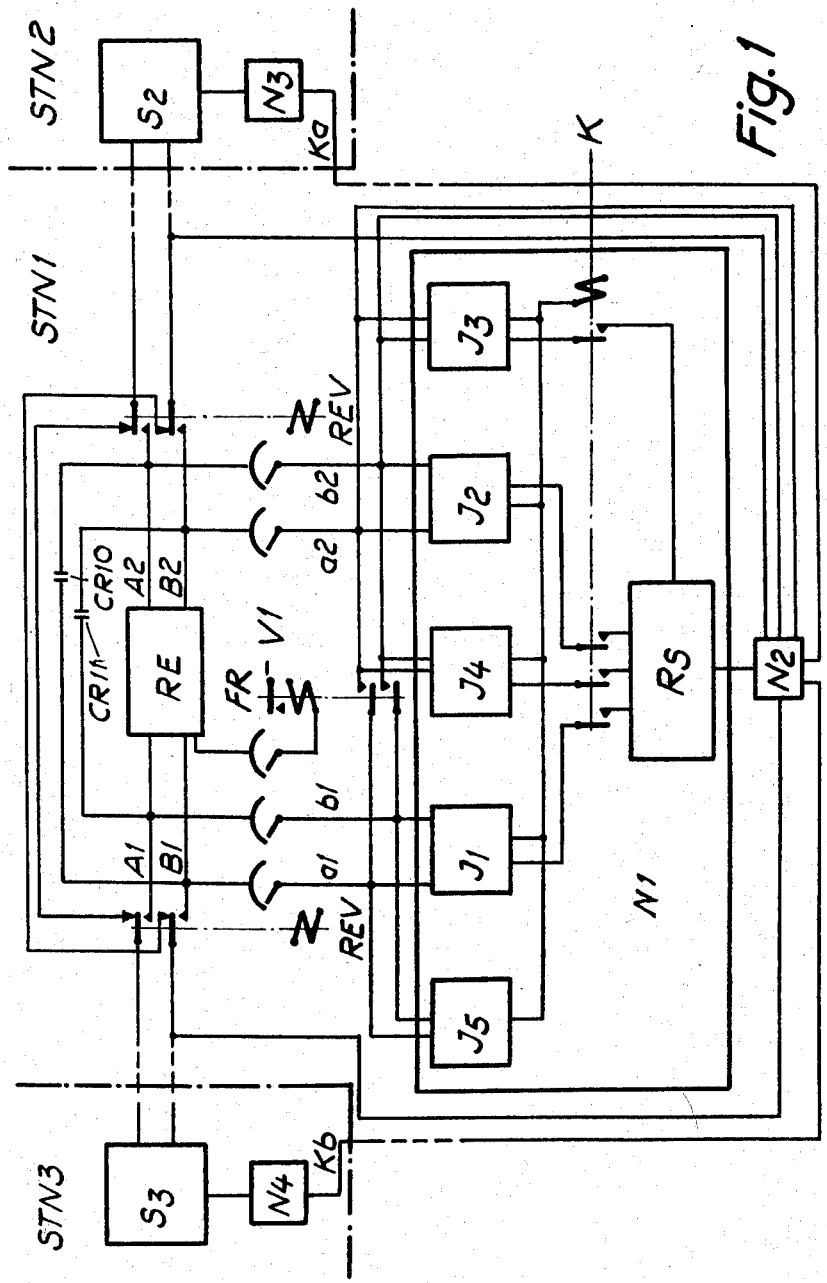

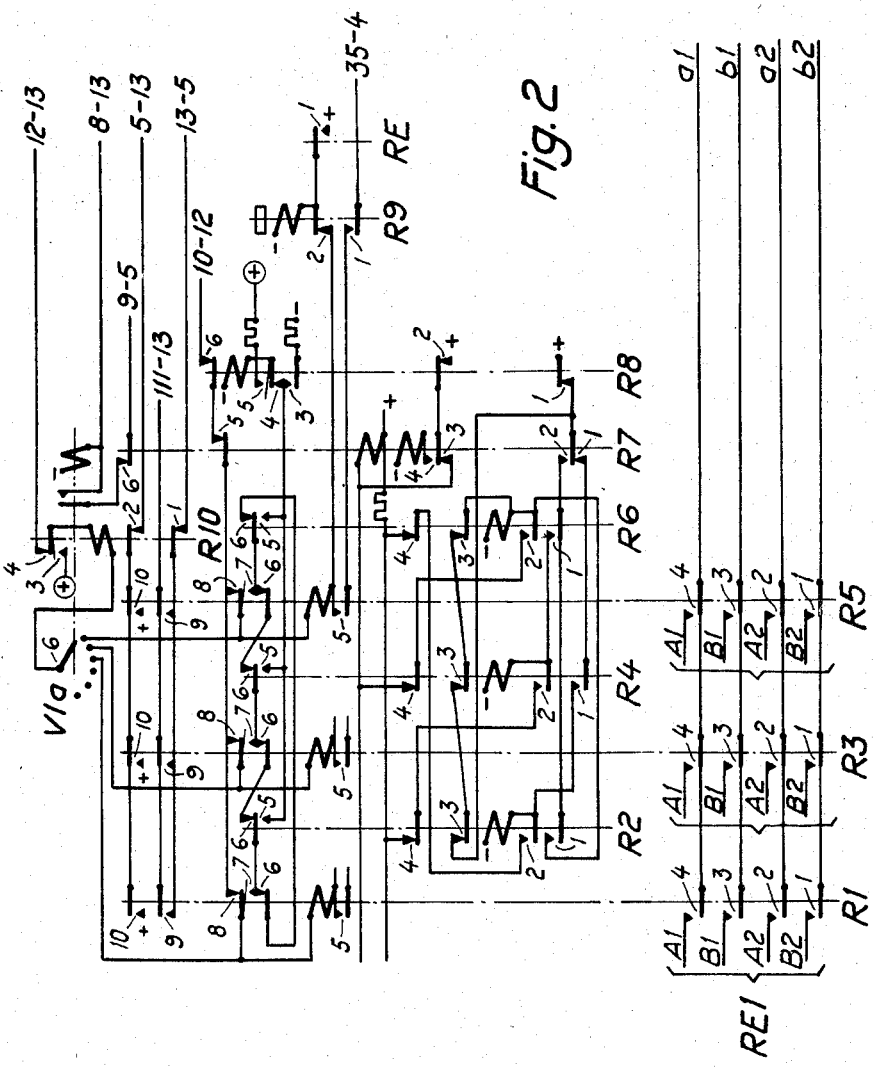

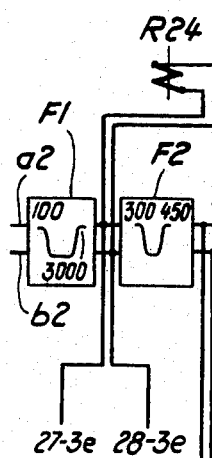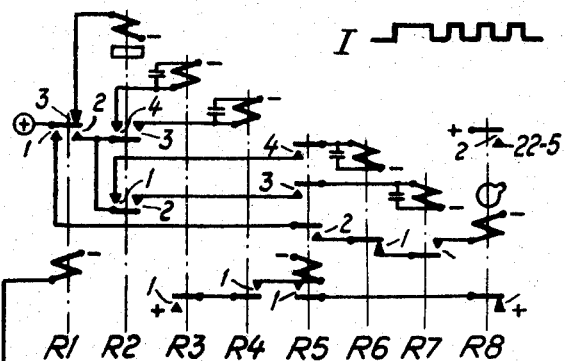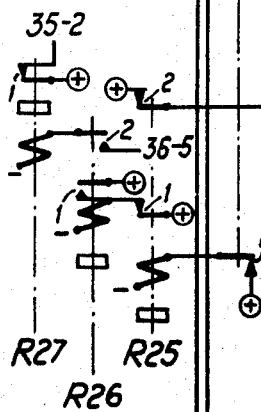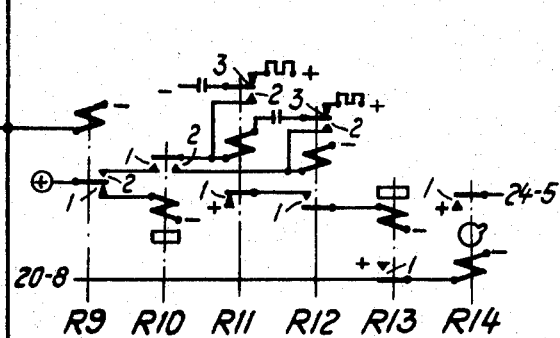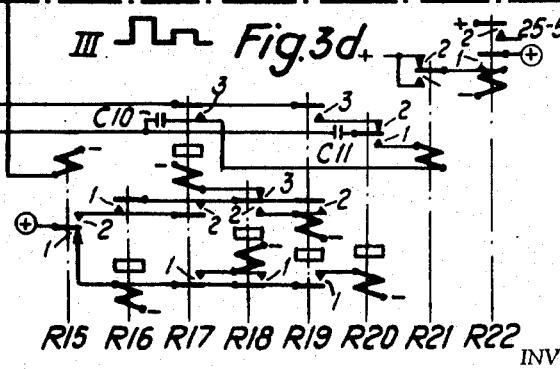

INVENTORS
STEN DANIEL VIGREN
PER HARRY ELIAS CLAESSON
BY
ATTORNEYS

R1 R2 R3 R4 R5 R6 R7 R8

Feb. 10, 1959  S. D. VIGREN ET AL  2,873,322
AUTOMATIC SERVICE CONTROL SYSTEM WITH FAULT RECORDING
Filed Dec. 28, 1954  19 Sheets-Sheet 18

INVENTORS
STEN DANIEL VIGREN
PER HARRY ELIAS CLAESSON
ATTORNEYS

1

2,873,322

AUTOMATIC SERVICE CONTROL SYSTEM WITH FAULT RECORDING

Sten Daniel Vigren, Stockholm, and Per Harry Elias Claesson, Danderyd, Sweden

Application December 28, 1954, Serial No. 478,122

Claims priority, application Sweden December 30, 1953

15 Claims. (Cl. 179—175.2)

In manual telephone systems it is the task of the operators not only to set up connections between the subscribers but also to report arising faults to the service personnel, and then the operator also reports the nature of the fault, which highly facilitates the location of the fault.

In automatic telephone systems conditions are different. In such systems the subscriber does not as a rule report a fault but repeats his attempt to establish a connection. Furthermore it may often occur that a faulty connection has already been released before the fault has been reported and the service staff has had time to intervene, since nearly all switching elements in an automatic telephone system must be designed to take down incomplete connections after a short time so that rapidly spreading congestions do not arise.

Hitherto substantially the same service organization has been used for remedying faults in manual and automatic telephone systems. By and by it has, however, proved more and more difficult to handle the maintenance of the latter system by fault reports and rapid fault location. However, attempts have been made to introduce in automatic telephone systems special maintenance equipment capable of responding as quickly and versatilely as the automatic switching equipment. Thus for instance so called station testers have been installed which perform repeated attempts to connect to predetermined numbers in the same manner as if a subscriber or operator should establish successively a large number of connections. In this way an alarm is obtained if the connection is not extended to the predetermined number. Systematic testing of telephone exchanges, so called routine testing, has also been previously applied. In crossbar switching systems working according to the by-path principle another expedient for the maintenance has been created in the so called centralographs which consist of recording instruments recording within the actual exchange which elements have been used in a connection not completed and in certain cases also how far the connection has been extended.

Thus the known arrangements have only been capable of indicating the location of certain faults within the own exchange, and therefore the need of centrally operating systems for recording faults within whole automatized areas is very large. In this case the recording of faults in the own exchange as well as faults in all the other exchanges along the connecting circuit must take place simultaneously or substantially simultaneously.

The invention described in the following affords a technically simple and economically advantageous solution of the said supervisory and maintenance problems. The invention which is applicable to telephone and telegraph systems as well as to other telecommunication systems operating wholly or in part automatically, is foremost characterized by the fact that a supervisory system is provided at a telephone exchange or at several exchanges within a larger or smaller area, said supervisory system being designed to be connected at random or in a predetermined manner at the moment of seizure to

2 switching members, e. g. registers, or to connecting lines or on the whole to one or more points in a communication circuit at the moment when the respective member or part of a communication path is seized, and to record lastingly the switching or current functions taking place in the member or communication circuit respectively in the case of faults or other conditions indicating that it is desirable to make a record of information on the connection which record can be analyzed afterwards. The system is thus designed to find out whether these switching and/or current functions are normal in which case the indications made by the supervisory system, i. e. storage of the information in question, are simply cancelled, or abnormal in which case the indications are recorded before the supervisory system is released.

The invention thus affords the possibility of indicating exhaustive information on any connection within e. g. a telephone system, and even the route of the connection within the system can be indicated and if required, recorded in order to make it possible to locate the fault with sufficient accuracy. The recording can take place either at the same time as the connection is established or at a later occasion.

In this way indication of information on one connection and communication circuit after the other can be obtained, while recording is performed only when desired, i. e. preferably only in the case of faults. It will be obvious that hereby all unnecessary recording can be avoided. By this arrangement the service personnel only has to give attention to such recordings which are of importance for the localization and remedying of the fault.

The invention is especially advantageous in automatic telephone systems, since the indicating equipment can indicate the digits dialled by a subscriber and how the registers in the telephone system send forward these digits and other control signals in the connection. Preferably there should then be included in the indicating and recording equipment a so called speech recording apparatus and a centrograph, printing telegraph receiver or similar apparatus which records the said characteristics by printing characters or numerals or punching holes or in some similar manner. Preferably the system is also combined with a finder device which finds out at or within which exchange a faulty connection has been stopped and eventually also in which part of such exchange the fault has occurred. This can be brought about in different ways. Thus each exchange may be provided with a code signal sending device which permits the identification of the exchange, or a selective network may be provided common to the exchange where the indicating and recording equipment is located, and the other exchanges. Through this network the exchange where the connection has been stopped, can be indicated by a finding procedure.

Assuming that the indicating and recording equipment is located in a so called tandem exchange and preferably associated with the registers at this exchange, finding and recording of a connecting path from said exchange can be effected towards the called subscriber (the B-subscriber) as well as towards the calling subscriber (the A-subscriber). When the finding procedure is directed towards the calling subscriber, it is of course presupposed that the call has reached the register but that some fault, e. g. distorted dial pulses, noise etc. has been indicated.

Since the system may further be adapted to indicate and eventually record all connections and their paths which are characterized by certain characteristics as for instance busy tone, denied call tone etc., statistic information can be obtained showing the rate of occurrence of these characteristics. In order to reduce the number of such recordings, a certain percentage of them may be selected by means of a selecting device added to the indicating and registering equipment, the said percentage being taken out in any arbitrary manner e. g. by means of a device performing a random selection.

In an embodiment of the invention for use in telecommunication systems having two or more exchanges provided with supervisory means, the various supervisory equipments are switched in as the connection proceeds to the corresponding exchanges, so that in the different exchanges local recordings can be obtained which relate at least to the switching means or switching operations within the respective exchange. Then each supervisory equipment, when switched in, may cause the release of the supervisory equipment located at the next preceding exchange. However, it may be advantageous to let e. g. the supervisory equipment located at the first exchange in a connecting path remain connected during substantially the whole time a connection is being established, and eventually design this supervisory equipment to transmit in response to certain predetermined indications signals to the supervisory equipment at the subsequent exchange or exchanges which signals cause the lastmentioned supervisory equipment to record local indications.

The invention will be described more in particular in conjunction with the accompanying drawings on which:

Figure 1 shows schematically how the invention is applied to an automatic telephone network.

Figure 2 shows a switching device (V1 in Figure 1) for connecting the supervisory equipment (N1 in Figure 1) to different registers RE.

Figure 3a shows a device for indicating tone signals (number unobtainable tone) which are transmitted on the connection when the called number is unobtainable.

Figure 3c shows a device for indicating tone signals transmitted on the connection when a called subscriber is rung (ringing tone) or when he is busy (busy tone).

Figure 3d shows a device for indicating tone signals of varying amplitude (denied call tone).

Figure 4 shows an amplifier F1 for amplifying the speech frequency band 100–3000 cycles per second, an amplifier F2 for amplifying a tone frequency band of 300–450 cycles per second, and a relay device for releasing the supervisory equipment.

Figure 6:
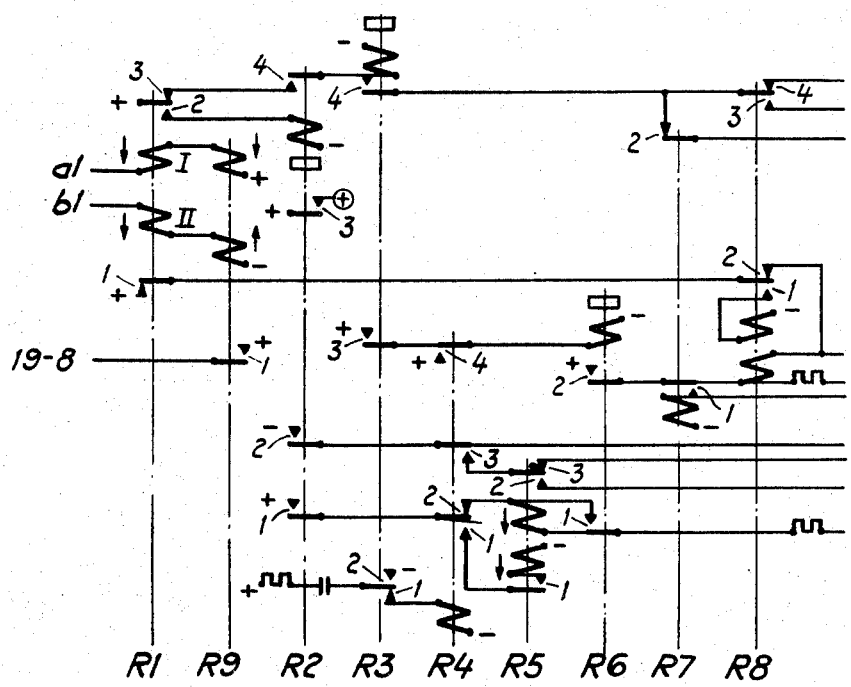
Figure 7:
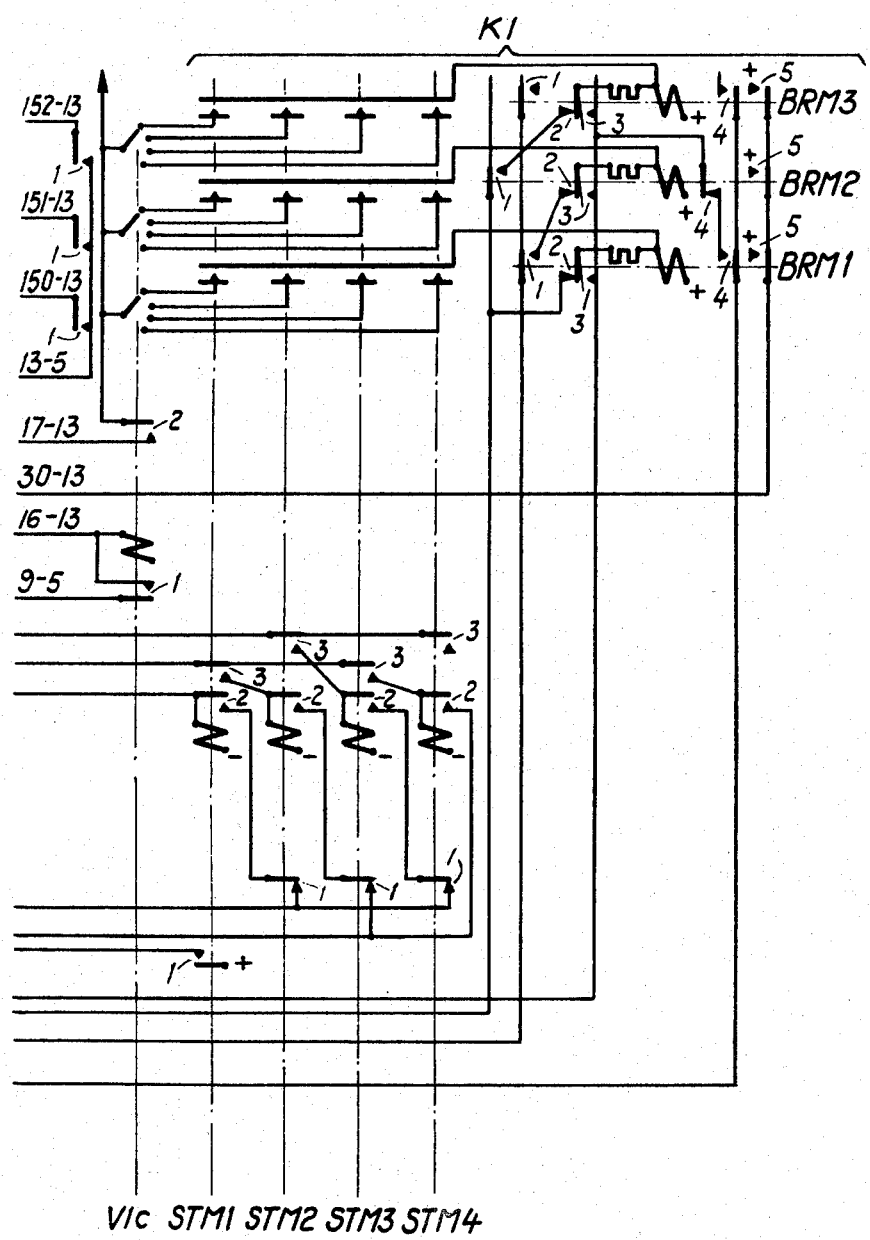

Figures 6 and 7 which should be placed side by side, show a device (J1 in Figure 1) for indicating and storing digits sent to a register.

Figure 8:
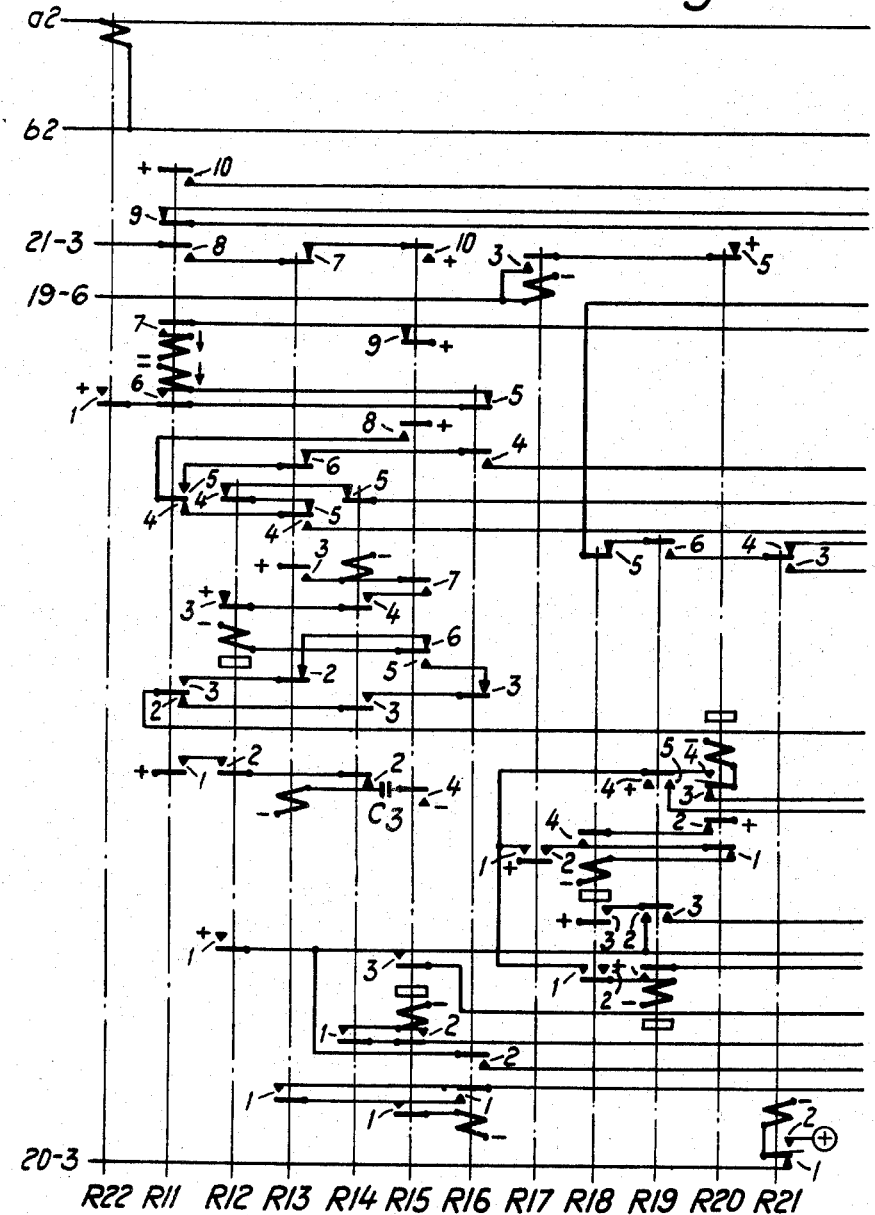
Figure 9:
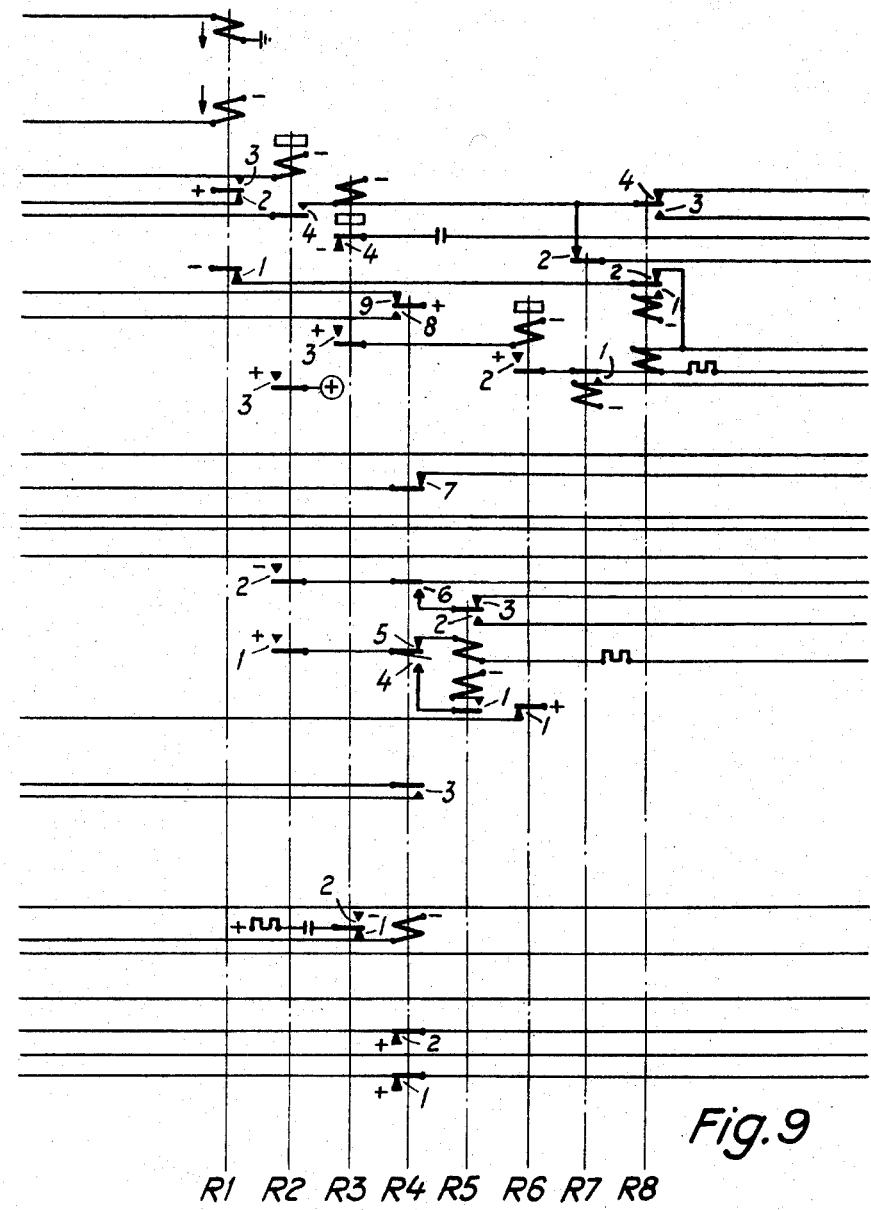
Figure 10:
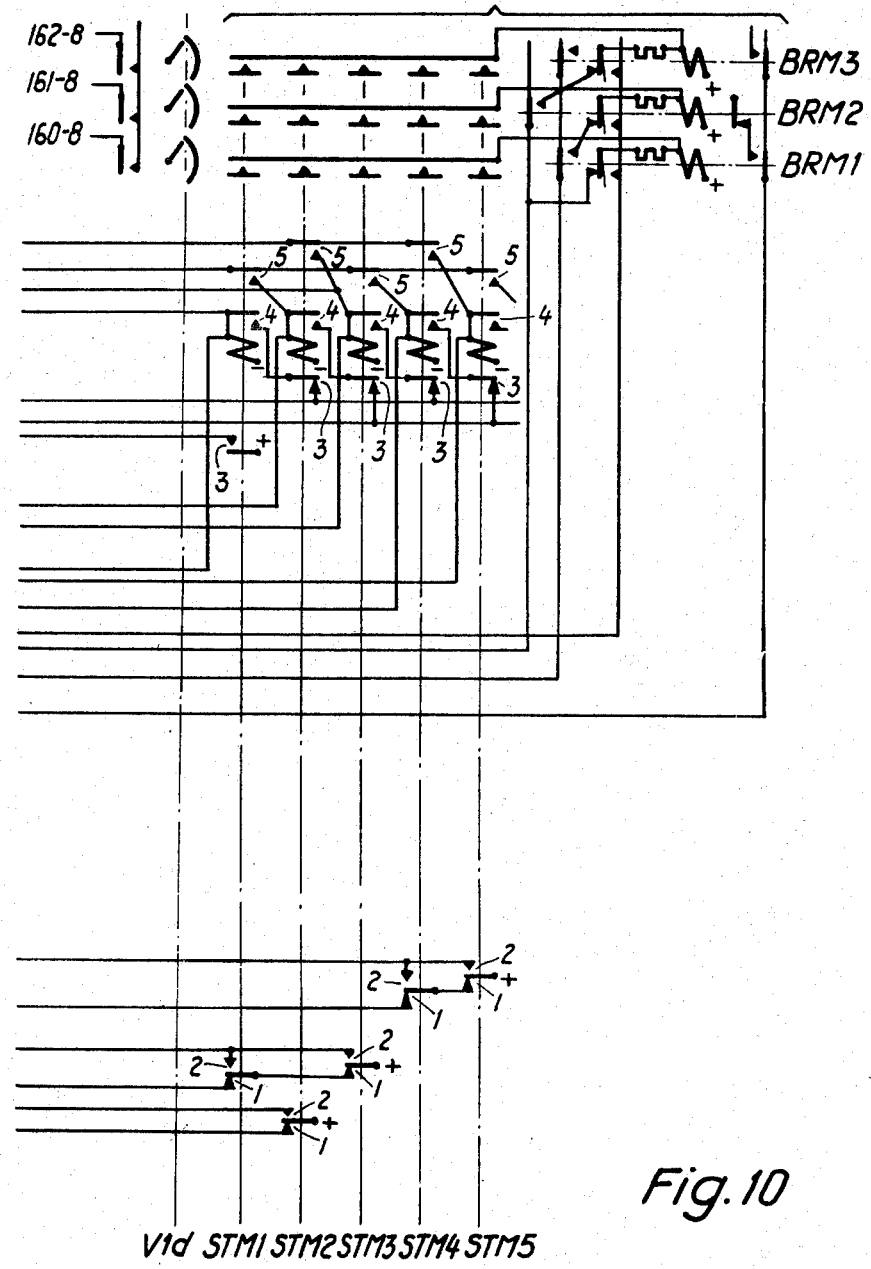

Figures 8, 9 and 10 which should be placed side by side, show a device (J2 in Figure 1) indicating and storing digits transmitted from the register, received current reversals and forced release signals.

Figure 11:
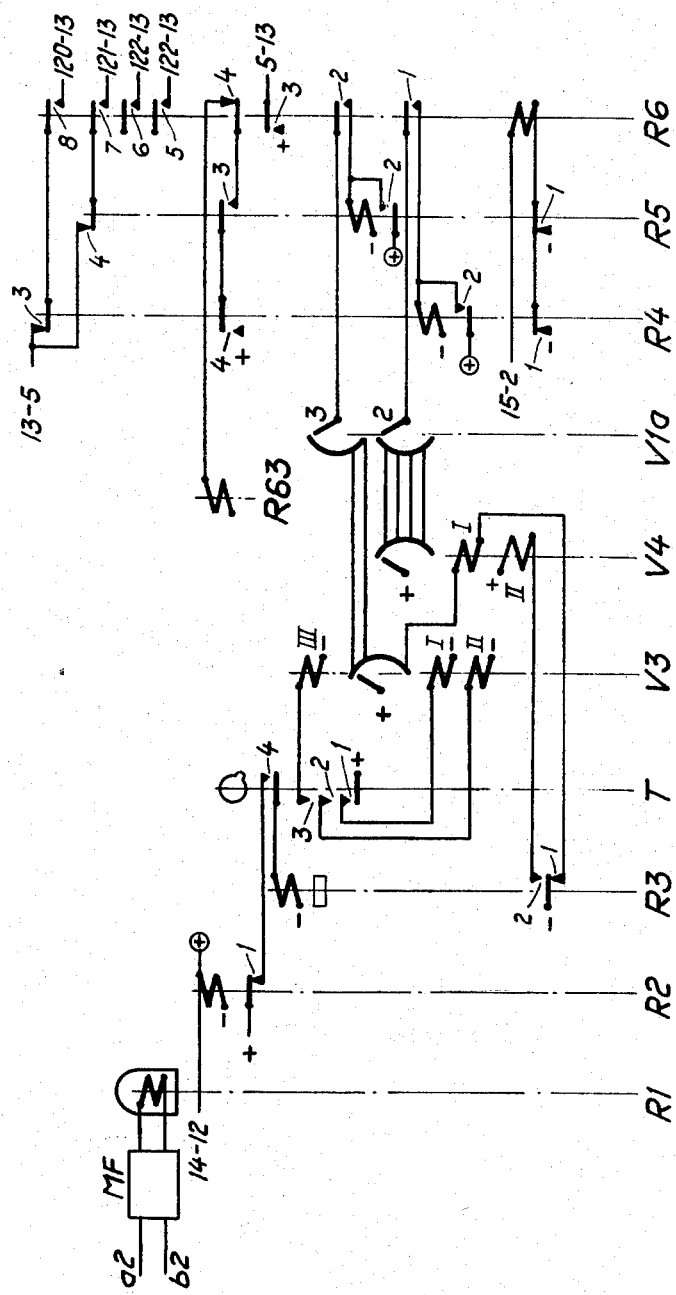

Figure 11 shows a speech recording device (J3 in Figure 1).

Figure 12:
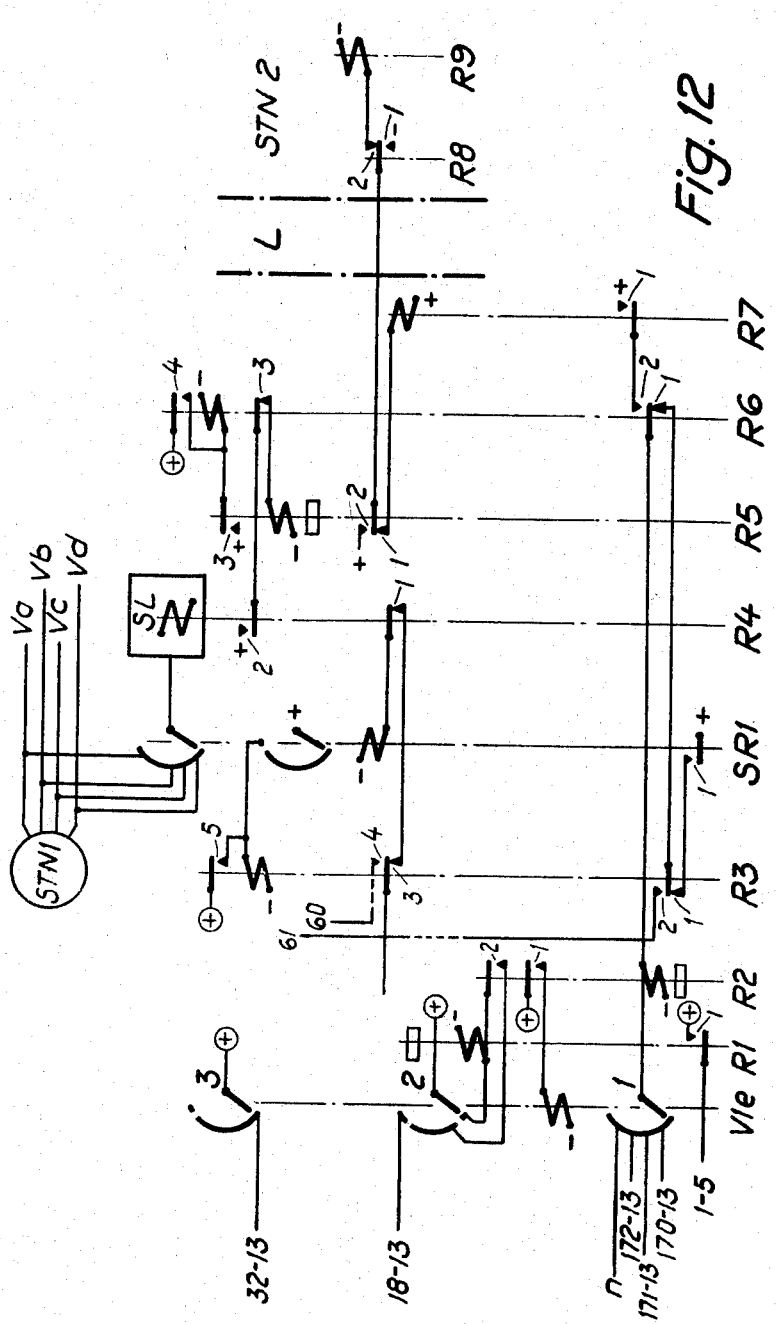

Figure 12 shows a tone tracing device for indicating the communication path and switching stages or members included in that path.

Figure 13:
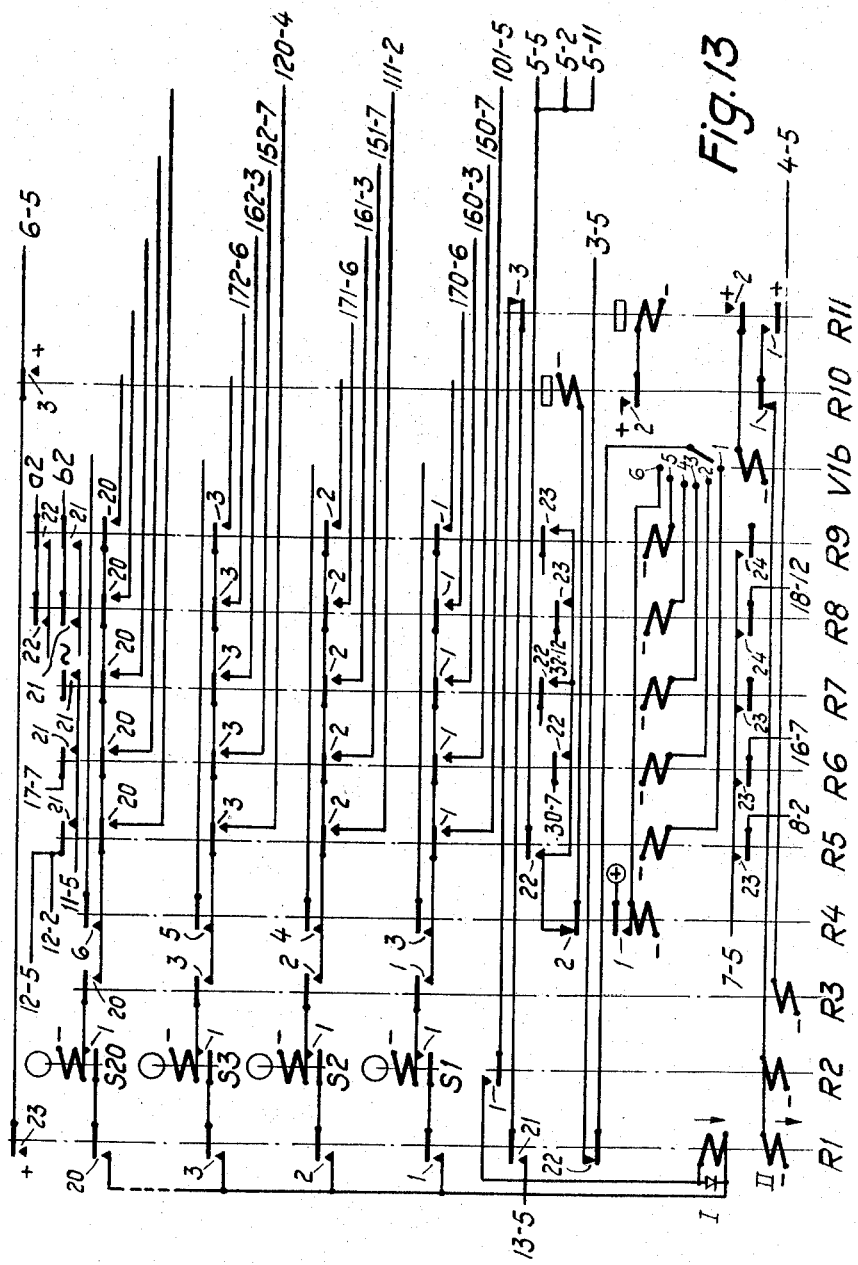

Figure 13 shows a device for recording by stepping digit wheels and stamping their positions onto a paper sheet.

Figure 14:
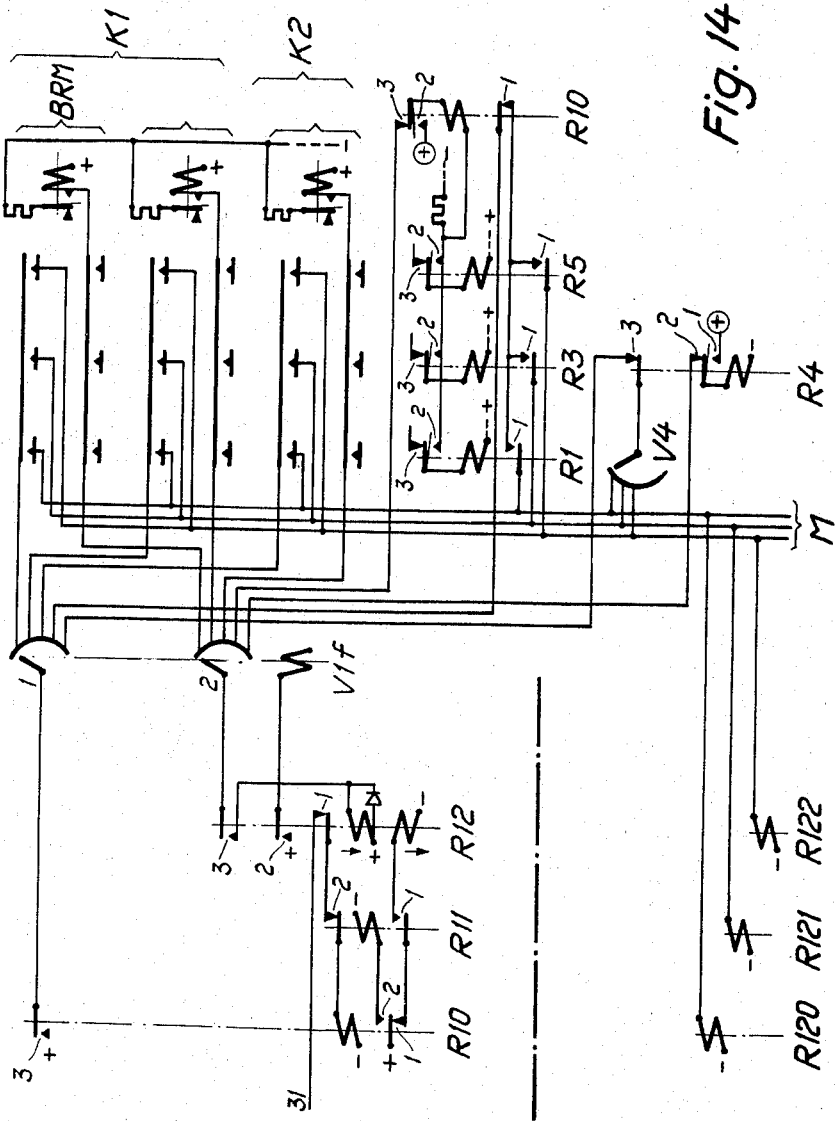

Figure 14 shows a device for recording by means of a typewriter or the like.

Figure 15:
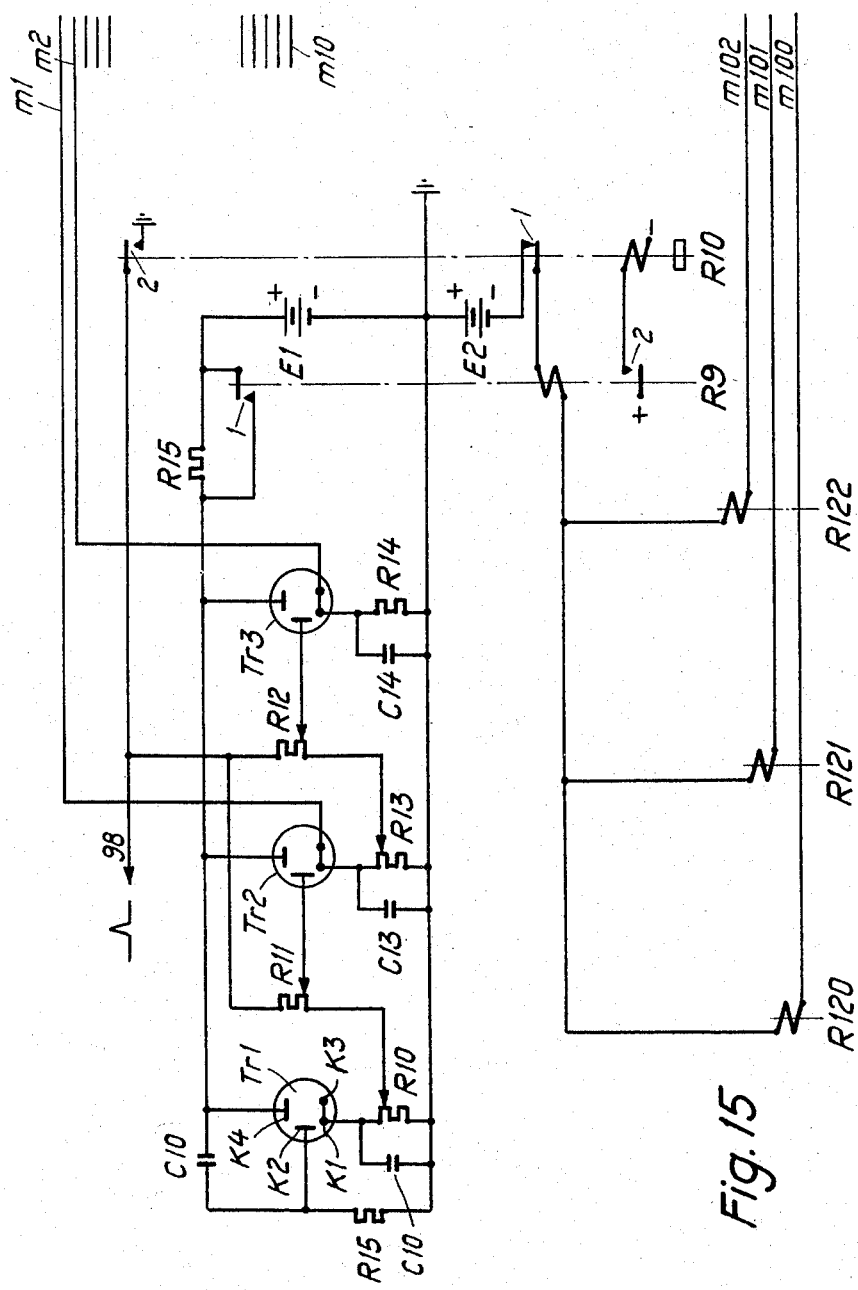

Figure 15 shows a device for electronic scanning in the case of recording by means of a typewriter.

Figure 16:
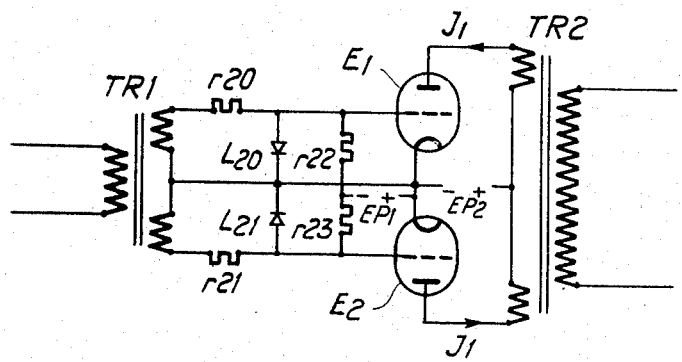

Figure 16 shows an amplifier device having larger gain for small amplitudes than for large amplitudes.

Figure 17:
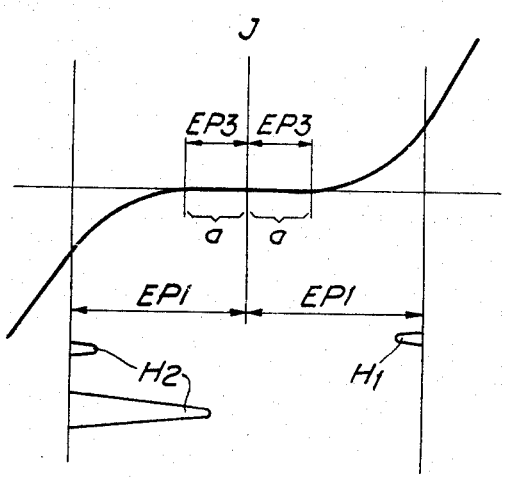

Figure 17 shows gain characteristics of the amplifier device according to Figure 16.

Figure 18:
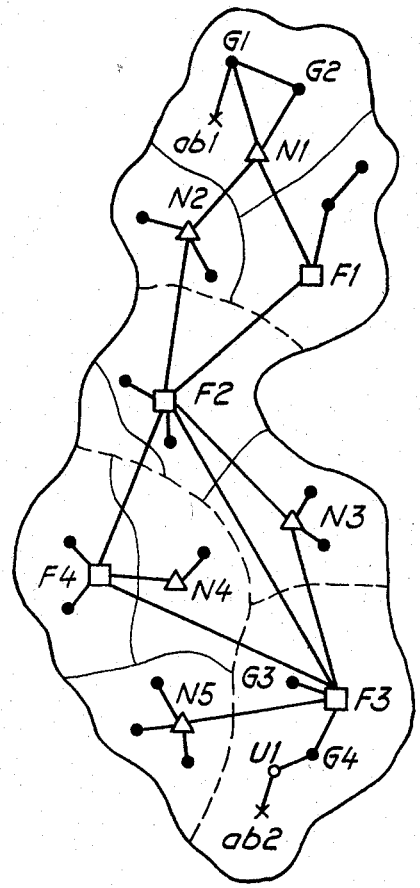

Figure 18 shows an exchange area layout.

Figure 19:
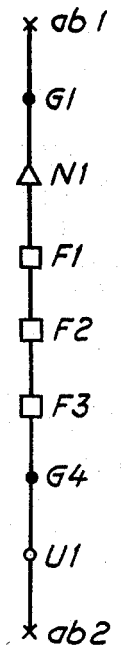

Figure 19 shows how a connection can be routed within the exchange area shown in Figure 18.

Figure 20:
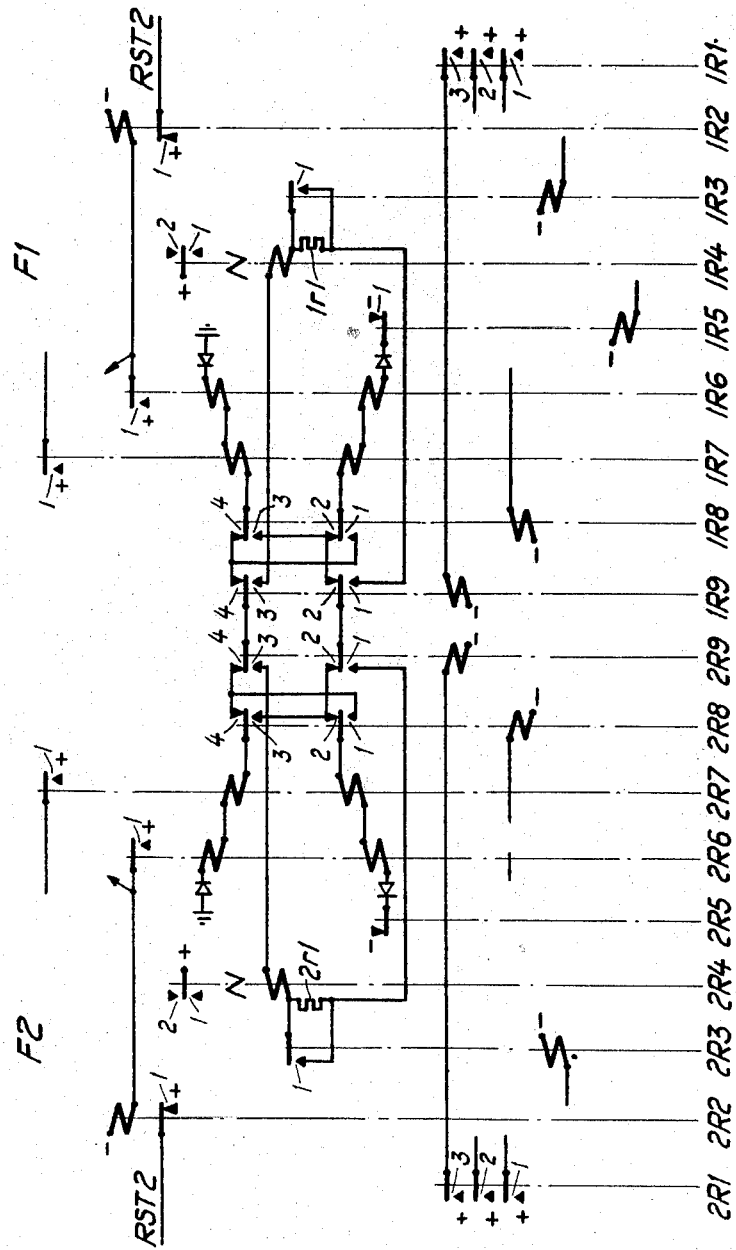

Figure 20 shows a signal repeater for the transmission of signals between the supervisory equipments at two exchanges.

Figure 21:
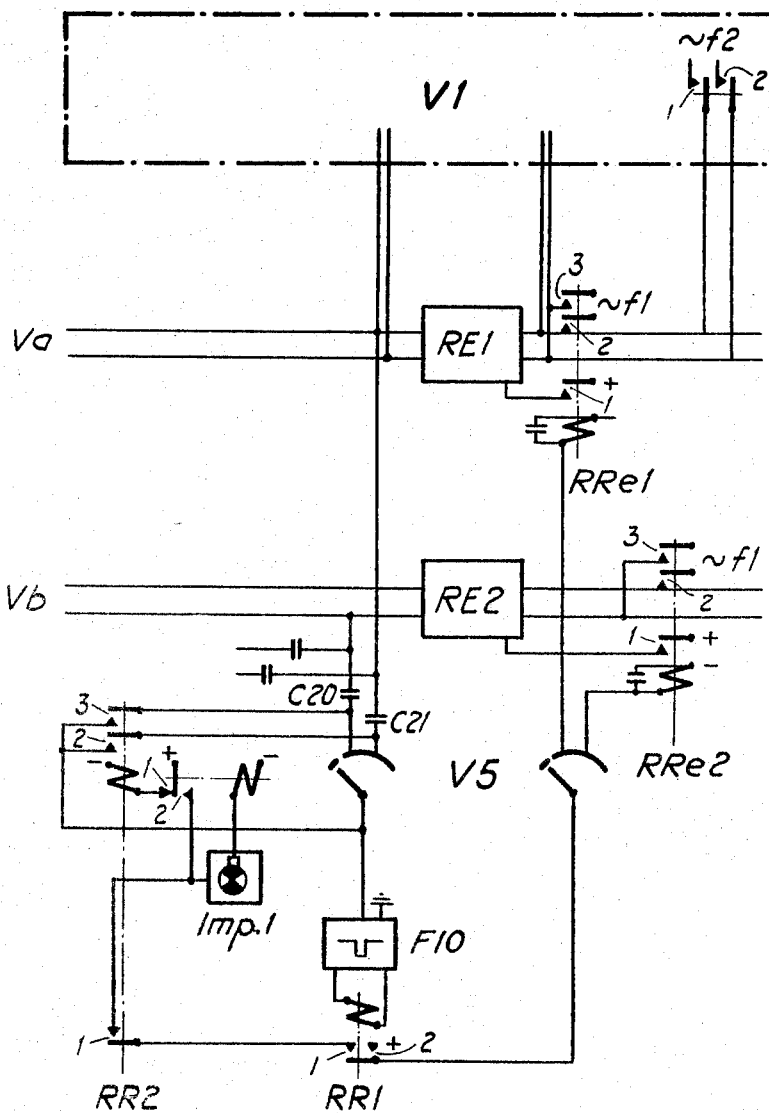

Figure 21 shows a device for holding a register connected by means of a special tone (register tone).

In a plurality of the figures conductors are marked with a plus sign within a circle. This indicates that these conductors which are interconnected, receive positive potential via contacts on relays R2 in the devices according to Figures 6 and 9 which relays in operated condition connect the conductors marked in said manner to the positive terminal of a battery.

Conductors passing between two figures have been given the same number in both figures. In each figure this number is accompanied by a numeral indicating the number of the other figure to which the conductor leads. These reference numerals are separated by a hyphen. Thus for instance the designation 15–2 indicates that the number of the conductor is 15 and that it leads to Figure 2.

In the following description the various contacts of relays and control magnets have been designated by the number of the respective contact accompanied by a hyphen and the designation of the respective relay or magnet. Thus for instance the designation 4–R8 means contact number 4 on relay R8.

Figure 5:
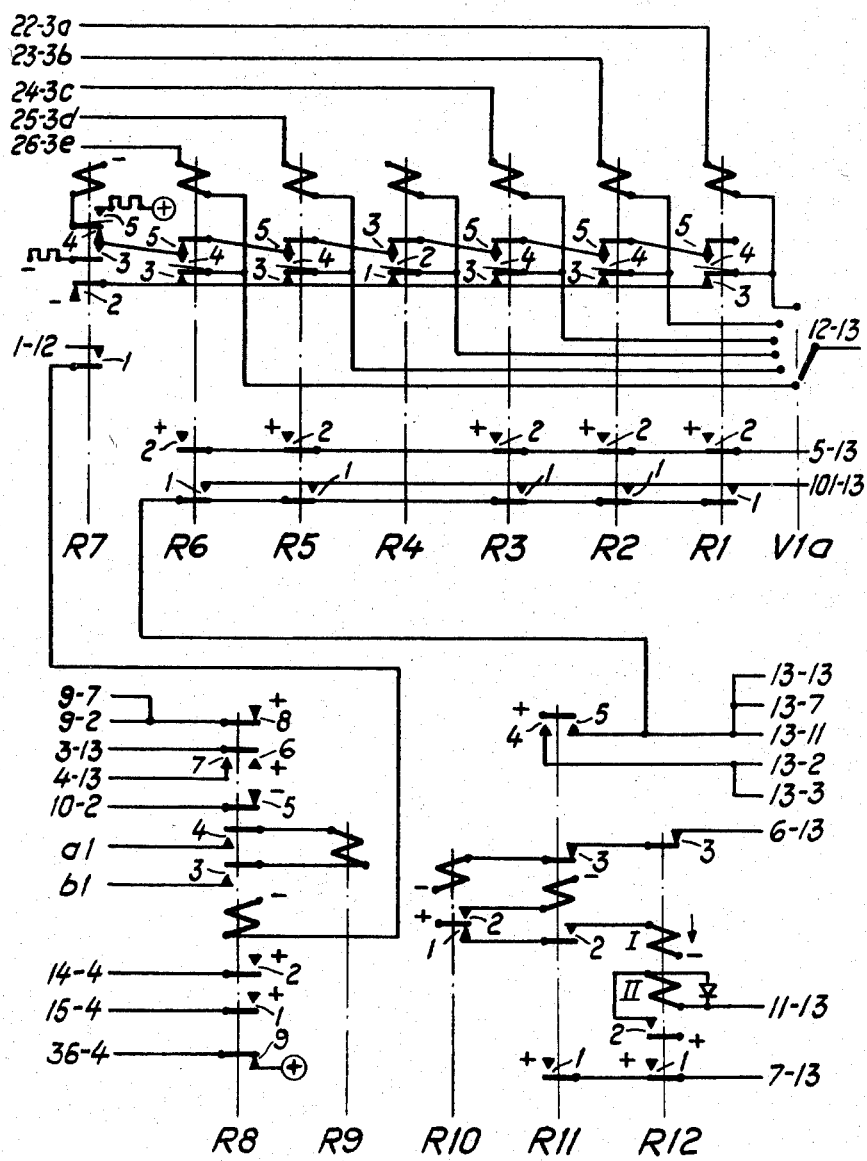
Figure 5 shows a relay chain for indicating that recording shall take place, a pulse relay chain for the recording equipment, and a relay R8 for the initiation of the recording.

A number with parenthesis accompanying the designation of a relay, magnet or other device in the following description indicates the number of the figure in which the relay, magnet etc. will be found. Thus the designation R8(5) indicates that relay R8 in Figure 5 is referred to.

In Figure 1 there are shown three telephone exchanges STN1, STN2 and STN3. It is assumed that STN1 is a main exchange, so called group centre, in a wholly automatized area. Only one register RE has been indicated in this exchange. The invention can of course be applied in connection with registers of widely varying designs and modes of operation. In the present embodiment of the invention the registers are assumed to be for instance of the type described in the publication "Telegrafverkets koordinatväljaresystem, Standard 41" and in its supplement "Principschemor för Telegrafverkets koordinatväljaresystem Standard 41" by S. D. Vigren and Artur Finström, Stockholm, 1950. The register is connected to the connecting circuit by a register selector or the like which is symbolized in the figure by the connecting relays REV.

In exchanges STN2 and STN3 only normal switching members S2 and S3 respectively have been indicated. The supervisory equipment according to the invention is represented in the exchange STN1 by the device N1. This is combined on one hand with a switching device V1 and on the other hand with an indicating device N2. These two devices will be described below. The switching device V1 is preferably so designed that it connects different registers at different times to the supervisory equipment N1. Preferably V1 is so designed that it connects N1 to the input as well as to the output side of a register at about the same time as a call is received by the register. For this purpose the switching device V1 may consist of a relay chain forming a so called preference chain or lockout circuit the starting point of which is moved step by step so that the different registers are given preference in turn to the connection to device N1. The connection to the registers may also be effected at random.

In the case that a complete or simplified supervisory equipment is to be connected to a connecting circuit to which a superivsory equipment in another exchange has already been connected for the purpose of obtaining indications and/or recordings at different exchanges as the connection proceeds, the switching device V1 at the other exchange can be designed to effect by hunting with the guidance of a tone frequency signal or other characteristic signal applied to the respective connection by the previously switched-in supervisory equipment connection of the supervisory equipment of said other exchange to a register or other centrally located member which is included in the respective connection which is to be supervised. As regards such hunting for and identification of a certain connection reference is made to patent application No. 415,092, filed by D. V. L. Lindström and A. G. G. Cronsten on March 9, 1954.

N2 comprises means for indicating the route along which a connection has been extended and eventually also for indicating more accurately the location of a fault at an exchange in the connecting path. For this purpose N2 is designed to cooperate over lines Ka, Kb with a device N3 at exchange STN2 and with a device N4 at exchange STN3. Devices N3 and N4 should preferably be provided with equipment for the indication and storing of connecting characteristics indicating the place where a fault has occurred within the respective exchange. The last-mentioned equipment may advantageously consist of crossbar switches which have their selecting and holding magnets connected in such manner that indication of the location of the fault is obtained. If for instance the fault has occurred in a group selector, a spring set in the crossbar switch may be actuated upon the switching-in of the group selector and another spring set on through-connection in the group selector. Thus if one but not the other spring set is operated, indication has been obtained that the fault is located within the group selector. The crossbar switch is preferably provided with signal transmitting means which transfers characteristics to N2 indicating how the spring sets are operated in crossbar switches belonging to N3 and N4 so that the corresponding recording can be obtained at exchange STN1.

In the abovementioned patent application No. 415,092, filed by D. V. L. Lindström and A. G. G. Cronsten on March 9, 1954, there is described in detail a device for the localization of the connecting circuit and/or switching members associated therewith, and the arrangement according to the present invention can advantageously be applied in combination with the arrangements described in said patent application which then serve the purpose of delivering information on the connecting path, seized switching members and lines etc.

The combined indicating and recording means N1 can be designed in different ways. Thus for instance it way consist of a centralograph or comprise digit wheels rotated by a stepping mechanism and a recording magnet which when operated records on a paper sheet the settings of the digit wheels. If for instance a group of digit wheels is connected to the input side of register RE and are arranged so that each digit is represented by the setting of one digit wheel, and another group of digit wheels is connected to the output side of register RE and are arranged to be rotated by means of pulses outgoing from the register, and still another group of digit wheels are arranged to be actuated by other signals, e. g. current reversals on the line, recording of the signal transmission is obtained on the operation of said recording magnet. If the said recording magnet does not actuate the digit wheels, but the digit wheels are instead restored, the indications are cancelled. The indication of the traffic channels from the recording exchange can be accomplished in such manner that a special potential or tone is applied to the connection at that exchange in accordance with the principles set forth in the abovementioned patent application. By means of finder devices connected to all the outlets from the exchange the route along which the connection has proceeded is found, and then identification of the next exchange is also obtained. The route of the connection outgoing from the latter exchange is then found. The starting of this finding operation and transfer of the signal characteristics for recording at the recording exchange takes place over said selective network. When the special potential or tone is no longer found, the connection has been broken, which is also indicated at the recording exchange. In the same manner as finding of connecting paths can be carried out from one exchange to the other the path and the switching members within a certain exchange can be indicated, the corresponding signal charactertiscs being transferred for recording. Digit wheels or other indicating means are then also provided for indication of the indications obtained from devices N3 and N4 at the other exchanges. Since the indications from exchanges STN2 and STN3 will be of interest only when a fault is found or some predetermined characteristic is present, i. e. only when it has been ascertained that recording is to take place, recording of the pulses from the input and output sides of the register can be performed first, and then the digit wheels can be restored and the recording paper be advanced, and thereupon the digit wheels can be rotated again in response to characteristics from N3 and N4 and a further recording take place.

It may often be advantageous to use separate indicating and recording means, for the indicating means must be in use permanently, while the recording means are only utilized when an indication is of such nature that recording is desired. Therefore separate indicating means have also been shown in Figure 1. Thus indicating device J1 has for its purpose to indicate pulses received by register RE, and J2 pulses outgoing from the register, J3 is a so-called speech recording device, and J4 is a device for indicating certain characteristic signals on the line, e. g. tone signals. The characteristics which call for recording of the indications may e. g. be the following:

(a) The connection has not been completed. Signal tone is not applied to the line.

(b) The connection has been properly established, but noise tones are present. Such noise also comprises also the noise caused by contacts with varying resistance in the connecting circuit.

(c) Busy tone is applied to the connection.

(d) Denied call tone is transmitted.

(e) Number unobtainable tone is transmitted.

(f) The register indicates that the connecting circuit shall be recorded, e. g. when a certain number has been dialled.

(g) Conversation is commenced but becomes of short duration, which is often due to the fact that the calling subscriber has been connected to the wrong called subscriber.

(h) The called subscriber answers. (For statistical purposes.)

Recording in response to one or more of the above-mentioned or other predetermined characteristics can be effected either each time they occur or according to a random selection.

By means of a switching device K the recording device RS can be switched in only when said characteristics are obtained. Therefore recording device RS, being e. g. in the form of a centralograph with digit wheeels, can be common to several groups of indicating devices J1—J4. Switching device K is then so designed that it switches in only one indicating device at a time, but since recording can be effected quickly, there will be no undue waiting for the recording device to become available for a new recording. Indicating devices J1 and J2 preferably consist of crossbar switches of the same type as those described above in connection with N3 and N4.

The speech recording device is so designed that after indication which is not to be lastingly recorded, it is returned to the position existing at the moment of the last switching-in, while it is retained in the final position after having made a record which is to be preserved.

Indicating device J4 is designed as a tone signal receiver which is selective with regard to the different tone frequencies on the connection. Hereby selective indications can be obtained of the characteristics mentioned in items b–e above. Thus number unobtainable tones, busy tones and the like are recorded by means of a tone signal receiving device to the output side of which pulse selective relay devices are connected. Noise tones can advantageously be recorded by a receiving device having a frequency response characteristic corresponding to that of the human ear and being designed to be switched in on occasions when no tones should be present in the connection, e. g. the intervals between two tone pulses before the called subscriber has answered. Alternatively the noise tones can be indicated on basis of the fact that the frequency distribution within the speech frequency band becomes abnormal. Noise caused by contacts having varying resistance can also be indicated on basis of the fact that it contains frequencies which are very high as compared with the speech frequencies, or that the amplitude of a transmitted tone varies. Furthermore indicating device J4 can be completed with a so-called random selector so that random selection is obtained as mentioned above.

Device J15 is a so-called station tester of well known type (see e. g. "Tekniska meddelanden från Telegrafstyrelsen," Stockholm 1948, pages 82–86). This device is preferably switched in in the case of heavy traffic so that the various connections are routed by the same over different switching members.

In Figure 1 there are further shown two condensers CR10 and CR11 respectively which provide alternating current connections between the incoming and outgoing sides of the register RE. As will appear from the following detailed description of the invention the register is preferably kept connected to the telecommunication connection until registration has been completed, and in certain cases it is then necessary that speech connection shall be rendered possible in spite of the fact that the register is kept connected. Preferably these condensors are not permanently inserted but arranged to be connected in a predetermined stage of the establishment of the telecommunication connection, for instance in dependence on the switching members indicating by their operation that the called subscriber answers the call. On the other hand it is possible, at least in some kinds of systems, to keep instead the register selector in its operated position and release the register when its switching operations are completed. In this case a direct, galvanic connection can be established between the incoming and outgoing sides of the register selector by means of a switching member, e. g. operated on the release of the register from the register selector. Such a switching member is schematically represented in Fig. 1 as a relay FR. Obviously this arrangement may be combined with the first described condensor arrangement for the event an insertion of condensors is called for before the register is caused to be released.

SWITCHING DEVICE V1

As stated above the switching device V1 in Figure 1 should be designed so that the supervisory equipment is connected to the output side respectively of the register at about the same time as a call arrives at the register. In order that the different registers shall have the same probability of being connected with the supervisory equipment, switching device V1 should further be in the form of a relay chain forming a so-called preference chain or lock-out circuit with a starting point movable step by step so as to give the various registers preference in turn with regard to connection to the indicating equipment.

In the present case it is assumed that switching device V1 is connected to the indicating equipment via wires a1, b1, a2 and b2. Connection of the output or input side of the register is effected over contacts 1, 2, 3 and 4 on relays R1, R3 and R5 and wires A1, B1, A2 and B2, the latter being preferably connected to the multiple side of the register selector REV (Figure 1).

Relays R1, R3 and R5 which connect the supervisory equipment to the various registers, form a preference chain. Each of these relays is provided with a timing device in the form of a slow-operating auxiliary relay. In the figure only one such relay R9 is shown which is associated with relay R5. Each such slow-operating relay is energized when the associated register is seized (e. g. over contact 1-RE) and when it is operated, the energizing circuit for the associated register connecting relay (e. g. R5) is broken. The operation delay time is so chosen that such blocking of the associated register connecting relay takes place at a time when there is risk that signal transmission has already begun, so that the connection of the supervisory equipment to a register which is already transmitting signals, is prevented, whereby incomplete or misleading indications are avoided. The take-off point of relay chain R1, R3, R5 is moved stepwise by relays R2, R4 and R6 one of which is always in operated condition. Switch V1a and relay R10 are used for conveying information to the recording equipment as to which register has been taken into use. Description of this operation is found under the heading "Recording."

It will now be assumed that relay R6 has operated in response to current over contacts 1-R8, 3-R2, 3-R4 and 3-R6 and receives holding current over contacts 2-R6, 4-R4, 3-R7 and 2-R8. It is further assumed that register RE is seized by a call whereby contact 1-RE is closed. The slow-operating relay R9 is energized over contact 1-RE, and relay R5 is energized over the same contact and contact 2-R9, the winding of relay R5, contacts 8-R5, 5-R7, 6-R8, wire 10 and contact 5-R8(5). Relay R5 is operated and receives holding current over contacts 5-R5, 1-R9, wire 35 and contact 1-R27(4) after relay R9(2) has been operated. Relay R8 is energized over contacts 1-RE, 2-R9, the winding of relay R5, contacts 7-R5, 5-R6 and 4-R8. Relay R8 receives holding current over contact 5-R8. The energizing circuit for relays R1 and R3 is broken at contact 6-R8. When relay R8 is operated, the short circuit of relay R7 is removed by the opening of contact 2-R7. Relay R7 is energized in series with relay R6.

On simultaneous calls from a plurality of registers only that one of relays R1, R3 and R5 receives holding current which is first in the preference chain, i. e. that relay which when operated receives current over its own contact 7 and contact 5 of an operated relay R2, R4 or R6.

After the indication has been performed, the positive potential to relay R9 is removed from contact 1-RE and the positive potential from the indicating equipment for the holding of relays R8 and R5 is also removed. Relays R9, R5 and R8 are released. Then relay R4 is operated in response to current over contacts 1-R8, 2-R7 and 1-R6. Relay R6 is released because contact 4-R4 is opened. Relay R7 receives holding current over contacts 2-R8 and 4-R7, and relay R4 receives holding current over contacts 2-R4 and 4-R2. On the operation of relay R8 next time a call from the register occurs, relay R7 is released because the holding current is broken at contact 2-R8. When relay R7 is released, a circuit is prepared for the operation of relay R2. Since relays R2, R4 and R6 are operated in turn each time the equipment is taken into use, the preference of connection will obviously be given to the various registers in turn.

INDICATING DEVICE J4, FIGURE 1, FOR INDICATING THAT RECORDING IS TO TAKE PLACE

The characteristics indicating that indications received in devices J1, J2, J3 are to be recorded may consist of certain characteristic signals on the connecting circuit, e. g. tone signals, noise, etc.

In the present embodiment it has been assumed that recording is to take place in response to the following conditions:

(1) The called subscriber's line is out of service, or a number not existing at the exchange has been dialed. Most automatic telephone systems are provided with means for transmitting a "number unobtainable tone" to the calling party in these cases.

(2) The called subscriber's line is busy in which case busy tone is transmitted to the calling party, or the called subscriber does not answer within predetermined time in which case ringing tone is transmitted repeatedly to the calling party.

(3) All members in a switching stage are engaged in which case "denied call tone" is transmitted to the calling party.

(4) There are interference and noise tones on the connection.

(5) The call becomes effective but the conversation becomes very brief, probably because the calling subscriber has been connected to wrong number.

The means for indicating these conditions are illustrated in Figures 3a–e, 4 and 5. As will be seen from Figure 4 an amplifying device is connected to wires a2, b2 towards the line loop at the output side of the register. The device consists of an amplifier F1 which amplifies the whole frequency band in the respective connection, said frequency band being about 100–3000 cycles per second, and another amplifier F2 which is selective to the tone signal frequencies. The tone signals used in telephone systems have usually a frequency of 300–450 cycles per second. A receiving relay R23 is connected immediately after amplifier F2 which relay is operated when a tone signal arrives at amplifier F2. Since this relay has a tendency of being unduly operated by transient alternating current pulses occurring on pulsing, current reversals and the like, a slow-releasing auxiliary relay R25 is provided which is normally in operated condition in response to current over contact 1-R23 and is released when this contact is opened on the operation of relay R23 provided that the time during which said contact is open exceeds a certain length. When released auxiliary relay R25 causes in turn operation of relays R1, R9 and R15 in Figures 3a, 3c and 3d respectively in response to current over contact 2-R1. Furthermore auxiliary relay controls relays R26 and R27 the functions of which are related to the disconnection of the indicating devices from the register and will be described in detail in the following.

Figure 3B:
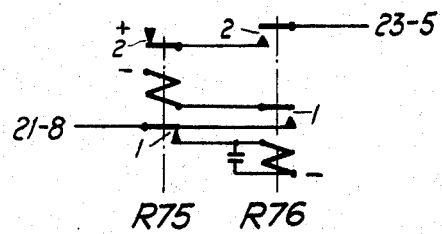
Figure 3b shows a timing device for indicating that a brief conversation has taken place.

Figure 3a shows a relay device R1—R8 which is responsive to number unobtainable tone which consists of one long tone pulse and three short tone pulses as shown in diagram I in Figure 3a. Figure 3a shows a relay device R9—R14 which is responsive to either busy tone or ringing tone. The nature of these tones will appear from diagram II in Figure 3c. Figure 3d shows a relay device R15—R22 which is responsive to denied call tone which consists of two successive tone pulses having different amplitudes as will be seen from diagram III in Figure 3d. Figure 3b shows a relay device R75—R76 forming a timing device for indicating brief conversations.

Figure 3E:
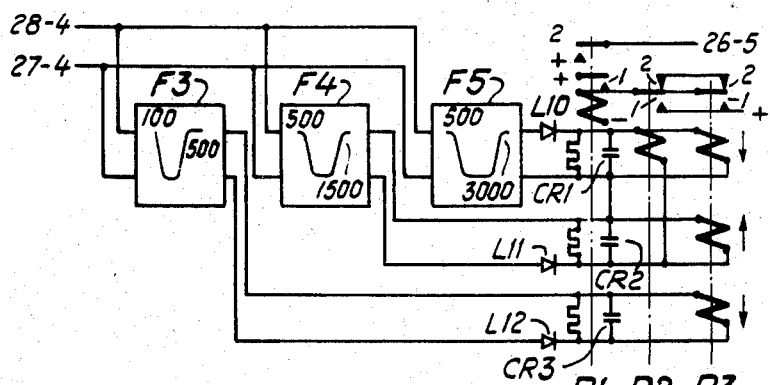
Figure 3e shows a device for indicating interference and noise tones appearing on the connection.

Figure 3e shows a device for indicating that interference or noise tones appear in the connecting circuit.

Figure 5 shows a relay preference chain adapted to bring about the effect that only one of the devices shown in Figures 3a–e which is first operated, gets its indication acknowledged indicating that that particular indication is the cause of the recording.

INDICATION OF NUMBER UNOBTAINABLE TONE

In the relay device R1—R8 in Figure 3a relay R2 is initially in operated condition due to current over contact 3-R1. The device is started when the first tone pulse is received and contact 3-R1 is opened, since relay R2 is then deenergized. Relays R3 and R4 and the associated capacitors receive current over contacts 1-R1, 2-R1, 3-R2 and 4-R2 during the release delay period of relay R2. When relay R2 is released, relays R3 and R4 are deenergized. The release delay periods of relays R3 and R4 are so chosen that relay R3 but not relay R4 is released in response to the long tone pulse, and the release delay periods for relays R6 and R7 are so chosen that relay R6 but not relay R7 is released in response to a short tone pulse. Therefore relay R5 will be energized by current over contacts 1-R3 and 1-R4 immediately after a long tone pulse has been received. When the first short tone pulse is then received, relays R6 and R7 are thus energized over contacts 1-R1, 2-R1, 1-R2, 2-R2, 3-R5 and 4-R5. Relay R6 is released and relay R7 remains in operated condition so that cam relay R8 is energized over contacts 1-R-, 2-R5, 1-R6 and 1-R7. For each long tone pulse and the subsequent short one relay R8 will be stepped one step. In this way relay R8 is stepped until a predetermined number of tone pulses have been received whereupon contact 2-R8 is closed. Then positive potential is applied over wire 22 to relay R1(5) which operates whereupon relay R7 is operated in known manner. Then relay R8(5) is operated and causes recording in a manner to be described below.

INDICATION OF BUSY TONE OR RINGING TONE

Relay device R9—R14 in Figure 3c starts when relay R9 is operated in the interval between two tone pulses, because relay R10 is then energized over contact 1-R9. When the first tone pulse is received, relays R11 and R12 are energized over contacts 2-R9 and 1-R10 and 2-R10 during the release delay period of relay R10. The release delay periods of relays R11 and R12 are so chosen that relay R11 but not relay R12 is released during the time when a tone pulse is transmitted. Immediately after a tone pulse has been received, relay R13 will thus be energized over contacts 1-R11 and 1-R12 whereby cam relay R14 is operated. When a predetermined number of tone pulses has been received, contact 1-R14 is operated whereby positive potential is applied over wire 24 to relay R2(5) which operates whereupon relays R7 and R8 are operated as described above. Of course different arrangements or at least relays having different release delay periods are required for the indication of both busy tones and ringing tones. In the embodiments according to Figures 3a and 3c the time interval between two tone pulses has not been taken into account. If this is to be done, the devices must be completed with additional relays which are responsive to such intervals.

INDICATION OF DENIED CALL TONE

Relay device R15—R22 in Figure 3d is responsive to tone pulses according to diagram III, i. e. two successive pulses having different amplitudes. During the first tone pulse regardless of the amplitude, relay R17 is energized over contacts 2-R15, 1-R16 and 3-R18 and connects capacitor C10 to amplifier F2. It is assumed that the amplifier delivers direct voltage (rectified alternating voltage), and therefore capacitor C10 is charged to a voltage corresponding to the amplitude of the tone pulse. When the first tone pulse ceases, relay R18 is energized over contacts 1-R15 and 1-R17 during the release delay period of relay R17. Relay R17 is released. At the beginning of the second tone pulse relay R19 is energized over contacts 2-R15, 1-R16 and 2-R18 during the release delay period of relay R18. Relay R19 connects capacitor C11 to the output side of the amplifier. When the last mentioned pulse ceases, relay R20 is energized over contacts 1-R15 and 1-R19 during the release delay period of relay R19 and operates. Then relay R21 is connected to capacitors C10 and C11 in such manner that the voltage difference between these capacitors is applied to the relay. If the amplitudes of the two received tone pulses have been different, relay R21 which is preferably polarized, will operate and in turn cause relay R22 to operate. Positive potential is applied to wire 25 whereby relays R5(5), R7 and R8 are operated as described above. This arrangement can also be provided with a cam relay or the like so that recording is not performed until a predetermined number of signals has been received.

INDICATION OF INTERFERENCE AND NOISE TONES APPEARING IN A CONNECTING CIRCUIT

The device according to Figure 3e is intended to indicate whether interference or noise tones appear in a connection. Such tones consist of noise currents having a relatively high frequency or clicks having relatively low frequency. When contacts included in a connection are defective, noise and clicks will often arise. The device shown in Figure 3e is therefore provided with three filters F3, F4 and F5. Filter F3 allows substantially only the passage of relatively low frequencies, e. g. 100–500 cycles per second, filter F4 allows the passage of medium high frequencies, e. g. 500–1500 cycles per second, while filter F5 allows the passage of relatively high frequencies, e. g. 1500–3000 cycles per second. The output voltage filter F3 is rectified by rectifier L12, that of filter F4 by rectifier L11 and that of filter F5 by rectifier L10. The difference between the voltages from filters F4 and F5 is applied to the winding of the polarized relay R2 which is designed so that its contact 1 is closed if the current F5 is predominant in magnitude. Relay R3 has three windings one of which is connected to filter F5, one to filter F4 and one to filter F3. The windings are further so connected that contact 1 of the relay is closed when the voltage from filter F4 exceeds the voltages from filters F3 and F5. In order that relays R2 and R3 shall not be operated by too short current pulses, delay circuits CR1, CR2 and CR3 have been provided.

When relay R2 or R3 is operated, relay R1 is energized. The positive potential on wire 26 causes relays R6(5), R7 and R8 to operate in the named order.

INDICATION OF BRIEF CONVERSATIONS

Relay device R75—R76 in Figure 3b is a timing device which starts when the called subscriber answers and causes recording when the conversation becomes very brief, e. g. shorter than 20 seconds. The device consists of a slow-releasing relay R76 having the said release time (20 seconds) and a relay R75 which is not slow-releasing. Relay R76 receives current over wire 21, contacts 8–R11(8), 7–R13 and 10–R15 and operates. The relay R75 receives energizing current over contact 1–R76 and operates. If the called subscriber replaces his handset during the release delay period of relay R76, relay R75 will be released because of the positive potential on wire 21 is removed which occurs when contact 8–R11(8) is opened. On the release of relay R75 positive potential is applied over contacts 3–R75 and 2–R76 and wire 23 to relay R2(5) which operates. The operation of relay R2 causes in the manner previously described relays R7 and R8 to operate whereby recording is started.

In order to reduce the number of such recordings the circuit to relay R2 can be run over a random indicator so that only a certain proportion of such calls is recorded. As random indicator an adjustable contact device on relay R14 can be used. In this case relay device R9—R14 is of course adapted to the indication of ringing signals.

EXAMPLES OF OTHER INDICATIONS

If a permanent record is desired in the case of noise exceeding a predetermined level, a sensitive relay R24 can be connected to the input side of amplifier F2 or to the output side of a special amplifier F1 having a larger frequency range and a frequency response characteristic corresponding to that of the human ear. Relay R24 on operation is caused to operate a relay in the relay chain in Figure 5 (not shown).

The amplitude of the received tone will of course vary due to different lengths of the lines. Therefore amplifier F2 is preferably provided with automatic volume control or similar automatic gain control which, however, should be somewhat delayed in the case that tone pulses of different amplitudes, e. g. those shown in diagram III in Figure 3d, are to be indicated.

The devices for the initiation of recording should of course also comprise switching means being operative in response to an interruption in the establishment of a connection. Thus for instance the fact that a connection has not been completed within a certain time indicates that such an interruption has occurred. Therefore said switching means may comprise a timing device which is started e. g. at the moment when a register is called, and causes the closure of a circuit for the initiation of recording if the digit transmission from the register has not been completed within a certain time, e. g. 40 seconds. Since the digit transmission of the register is dependent on the operation of subsequent switching stages, it may be assumed that if the timing device becomes operative the switching has been interrupted, all the switching means at a switching stage are engaged or the calling subscriber has not completed the dialling. In the shown embodiment the said timing device can be started in response to current e. g. over contact 3–R2 in Figure 6 and be restored to the initial position in response to current over a contact normally provided in the register which contact is operated when all switching signals have been sent out to the subsequent switching stage. If the said predetermined time is exceeded, the timing device causes the operation of a relay included in the relay chain shown in Figure 5 for the initiation of recording.

Instead of being restored in response to the completed signal transmission of the register, the timing device may be restored when a tone signal (e. g. a tone signal corresponding to a ringing signal sent to a called subscriber) is transmitted on the connection, the slow-releasing auxiliary relay R1 in Figure 4 restoring on its release the timing device. In this way recording is initiated e. g. if ringing signal is not sent to the called subscriber within a predetermined time after the connection of the register.

SPEECH RECORDING DEVICE J3, FIGURE 1

As stated above a speech recording device J3 according to Figure 11 is also connected to at least the a2 and b2 wires.

In the control device of the speech recording device shown in Figure 11 in simplified form R1 designates a recording head which acts upon a suitable recording medium, e. g. a magnetizable tape or disc. Recording head R1 is connected in the usual manner to an amplifier with associated magnetophone equipment MF, and it is assumed that the device is designed in well known manner so that a previous recording on the recording medium is erased as a new recording is made on the same.

It is assumed that the speech recording device is started and stopped by means of known devices which in the present case comprise a starting magnet which is energized by positive potential from indicating devices J1 and J2. Magnet R2 is also energized over wire 14 and contact 2–R8(5), and is so designed that on release it causes the return of the recording medium, e. g. rewinding in the case that a tape is used, and return of the disc if such a one is used. A contact device T is driven in synchronism with the recording medium. Contact device T comprises a number of successively operable contacts 1, 2 and 3 and a rest position contact 4. A switch V3 which is of the motor driven type and has three field magnets I, II and III, is driven in synchronism with the feeding of the recording medium, and thus switch V3 will indicate by its position at the end of the recording the displacement of the recording medium. In order to make possible the indication of large displacements there is provided a conductor connecting the last position of switch V3 with anothr step-by-step operated switch V4 which will thus be advanced once for e. g. every tenth step of switch V3. Switch V3 may be of the step-by-step type having two stepping mechanisms working in either direction, one mechanism having a winding I and the other one a winding II. Windings I, II and III of switch V3 are connected in such order to the pulse contacts 1, 2 and 3–T that the switch is driven in the direction which is considered as the forward direction when the recording medium is driven forwards for recording. In this case only winding I of switch V4 is connected over contact 6–R3 since relay R3 is maintained in released condition as long as magnet R2 is in operated condition and thus keeps its contact 1–R2 open. This results in the switch V4 being also driven in the forward direction.

When the recording is to be stopped, magnet R2 is released, and in the case that the recording is not to be maintained as a permanent record, the direction of movement of the recording medium is immediately reversed for return to the initial position. As soon as contact 4–T is closed relay R3 is energized by current over contacts 1–R2 and 4–T and since it is slow-releasing it then remains operated even during the periods when contact 4–T is open. Since the order in which contacts 1, 2 and 3–T operate has now been reversed, switch V3 will be restored to the initial position, and furthermore the direction of movement of switch V4 will also be reversed since winding II on this switch now receives current over make contact 1–R3. It is assumed that switches V3 and V4 are provided with rest position contacts which close a circuit when both switches have returned to the initial position, for stopping the return movement of the recording medium which will thus assume the same position as before the recording.

If on the other hand a record is to be maintained permanently, relay R6 is energized by current over wire 15 and contact 1–R8(5). Hereby the return of the recording medium is prevented so that it remains in its final position. The settings of switches V3 and V4 are now reported in a manner which will be described later to the recording device. In connection therewith relays R4 and R5 are operated, and when this occurs, an energizing circuit for relay R63 is closed over contacts 4–R4, 3–R5 and 4–R6, relay R63 being provided with contacts not shown which cause the restoration of switches V3 and V4 to the initial positions.

In the case that discs are used as recording medium, the switches V3 and V4 can thus indicate the tracks of the disc, while an additional similar switch may be provided for indicating which disc has been taken into use for the recording.

INDICATION OF DIGITS RECEIVED IN REGISTER RE, FIGURE 1

Indication of digits received in register RE takes place in an indicating device J1 in Figure 1. The switching device V1 connects in the manner previously described indicating device J1 via wires a1 and b1 to the input side of the register. Hereby indicating device J1 will be connected in parallel with the said register in the loop of the calling subscriber's line, and thus pulses transmitted over said loop will be received simultaneously in register RE and in indicating device J1.

In the present case indicating device J1 consists of a relay device according to Figure 6 with an associated crossbar switch K1 according to Figure 7. Relays R1 and R9 are connected over wires a1 and b1 into the line loop for the reception of break pulses, e. g. dial pulses, or negative or positive potentials, e. g. forced release signals. The windings of relays R1 and R9, which are preferably of the polarized type, have a high resistance in order that they shall not load the pulse circuit and thereby cause distortion of the pulses to the register. The windings of relay R1 are coacting, while those of relay R9 are counteracting.

Indication of received digits is effected in the following manner.

When wires a1 and b1 are connected to the input side of the register, relay R1 is operated, because windings I and II are connected in series with the line loop. Then the slow-releasing relay R2 is energized by current over contact 2–R1. When digit pulses are transmitted over the line loop, relay R1 will be operated and released in time with the pulses. When relay R1 is released, the slow-releasing relay R3 receives energizing current over contact 3–R1 and contact 4–R2. The operation of relay R3 leads to the result that the selecting magnet STM1 in crossbar switch K1 is energized by current over contacts 3–R1, 4–R2, 4–R3 and 2–R7, that relay R6 is energized by current over contact 3–R3, and that capacitor C1 is charged over contact 2–R3. On the operation of selecting magnet STM1 relay R7 is energized over contact 1–STM1. Then the energizing circuit for selecting magnet STM1 is broken at contact 2–R7. Relays R6, R7, R2 and R3 are operated during the pulsing. The two latter relays remain operated during the pulse break intervals of relay R1 due to their delayed release. The stepwise operation of selecting magnets STM is controlled by relay R8 which is in operated condition during every second pulse in a manner which is well known in the art and will not be described in detail. At the end of the pulse train relay R1 is in operated condition. Since contact 3–R1 is broken, relay R3 will then be released with a certain delay. The release of relay R3 results in relay R4 being energized by the charge of capacitor C1 over contact 1–R3. During the time relay R4 is in operated condition the holding magnet BRM1 of crossbar switch K1 is energized via contacts 2–R2, 3–R4, 2–R5 and 2–BRM1. Holding magnet BRM1 operates and receives holding current via contacts 3–BRM1 and 2–R2. Relay R4 is released when capacitor C1 has been discharged. The holding current for relay R6 ceases when contact 4–R4 is opened, and the relay is released with some delay. The release of relay R6 leads to the result that the energizing current to relay R7 and selecting magnet STM is broken at contact 2–R6 whereby relay R7 and the selecting magnet are released, and that relay R5 is energized since the short circuit across this relay is broken at contact 1–R6. Relay R5 receives energizing current via contacts 1–R2, 2–R4, 4–BRM1, 4–BRM2 and 2–R2. The relay prepares a circuit for the energization of holding magnet BRM2 after the end of the next pulse train. In non-operated condition the relay selects odd-numbered holding magnets for operation and in operated condition it selects even-numbered holding magnets for operation. The subsequent pulse trains are received and indicated on the holding magnets BRM2—BRM10 in the manner described above. In this way all digits received by the register will be indicated on crossbar switch K1.

As regards the reception of forced release signals and the indication of such signals reference is made to the description of the indicating device J2. The switch V1c shown in Figure 7 is used for the transfer of indications made on the crossbar switch K1 to permanent records. The operation of the switches will be described in connection with the description of the recording.

INDICATION OF DIGITS TRANSMITTED FROM REGISTER RE, RECEIVED FORCED RELEASE SIGNALS AND CURRENT REVERSAL SIGNALS

It will be assumed in the present case that switching members included in the connecting circuit are set by means of digit pulses sent from the register. Indication of these digit pulses and of current signals such as current reversal signals and forced release signals takes place on device J2 in Figure 1. Switching device V1 in the manner previously described connects indicating device J2 over wires a2 and b2 to the output side of register RE whereby digit pulses sent from the register and received current reversal signals are indicated on device J2.

Forced release signals are received on indicating device J1 whereupon transfer for indication takes place to device J2.

Indicating device J2 in the present case consists of relay devices according to Figures 8 and 9 with an associated crossbar switch K2 according to Figure 10.

Relays R1—R8 in Figure 9 perform the same functions as the corresponding relays in Figure 6, i. e. reception of digit pulses and indication of these pulses on the associated crossbar switch, and therefore reference is made to the previous description as regards these switching operations. Relays R11—R16 and R22 receive the current reversal signals and control the operation of selecting magnets and holding magnets as will be described below. Relays R17—R20 perform the corresponding functions in response to the forced release signals. Relay 22 for the reception of current reversals is a current direction indicating, high-resistance and preferably polarized relay.

Not only the digits sent from the register but also forced release signals and current reversal signals are indicated on crossbar switch K2. The lastmentioned indications differ from the indication of digits in that a holding magnet is first operated when a signal arrives and then a selecting magnet and a holding magnet. The selecting magnet which operates, corresponds to digit zero for a current reversal of normal length, digit one for a half current reversal, digit 2 on current reversal after previous half reversal, digit 3 if a forced release signal is transmitted when busy or ringing tone has been received on the line, and digit 4 if forced release signal is received before said tone has been received.

When the current direction is shifted on wires a2 and b2, relay R22 is thus operated and then relay R11 is energized by current via contacts 1–R22 and 5–R16. Relay R12 receives energizing current via contacts 1–R6, 3–R11, 2–R13 and 6–R15 and operates. Then relay R13 is energized by current via contacts 1–R11, 2–R12 and 2–R14. When relay R13 is operated, relay R14 is energized via contacts 2–R4 and 1–R14. Contact 2–R13 breaks the current to relay R12 which is released with a certain delay. During the time relay R12 was operated, relay R4 receives energizing current over contact 1–R12 so that a holding magnet was operated in the manner described in connection with Figure 6 indicating that a current reversal has been commenced.

It may be assumed that the current reversal condition remains only for a short time of the order of some hundred milliseconds. Current reversals of this length are used in a plurality of telephone systems to indicate to the register that a new digit series can be transmitted. The delay on release of relay R13 determines whether the length of the current reversal signal is to be counted as such a short current reversal. In this case relay R11 is thus released during the release delay time of relay R13. Now the selecting magnet STM1 receives current via contacts 8–R15, 4–R11 and 4–R13. Relay R4 receives current via contacts 1–STM3, 2–STM1 and 3–R15 and operates, and then a new holding magnet is operated. Due to the opening of contacts 1–STM1 and 2–R4 relay R15 is released, whereupon relays R16, R14 and R13 are immediately released. The lastmentioned relay is released because the capacitor C3 for release delay is disconnected by the opening of contact 4–R15.

If an abnormally short current reversal should appear, relay R11 is locked in operated condition by contacts 7–R11, 9–R15 and 8–R4 until a holding magnet has operated as described above. If relay R22 receives a new current reversal immediately after having been released and operates again during the time when relays R12—R16 are establishing circuits for the operation of selecting and holding magnets, relay R11 is prevented from operating since contact 5–R16 is open. Thus a switching operation in progress cannot be disturbed. If a current reversal should occur when pulsing is going on, the indication of the current reversal is delayed by contact 1–R6 being held open. Indication does not take place until relay R6 has been released.

When the current reversal condition is of long duration, e. g. when the called subscriber lifts his handset which is signalled by current reversal in a plurality of telephone systems, relay R13 will be released during the time when relay R11 is operated. When relay R13 is released, selecting magnet STM2 receives energizing current via contacts 8–R15, 5–R11, 6–R13 and 4–R16. Then relay R4 is energized over contacts 2–STM2 and 2–R16, so that another holding magnet is operated. Relay R16 is released since contacts 1–STM2 and 1–R4 are opened. When relay R16 is released, and contact 2–R6 is opened, relay R4 is also released.

When the current is shifted again and relay R11 is released, relay R12 receives current over contacts 1–R6, 2–R11, 3–R14, 3–R16 and 5–R15 and operates. Contact 3–R12 is opened whereby relay R14 is released. Since contact 3–R14 is opened, relay R12 is also released. During the time when relay R12 is in operated condition, relay R4 receives current and operates, so that still another holding magnet is operated. After the release of relay R4 selecting magnet STM3 receives current via contacts 8–R15, 4–R11, 5–R12, 5–R14 and 7–R4 and operates. Relay R4 is energized by current via contacts 2–STM3 and 3–R15. Contact 1–STM3 breaks the current to relay R15 which is released. Relay R4 is released when contact 3–R15 is opened, and selecting magnet STM3 when contact 8–R15 is opened. The current to selecting magnet STM3 is also broken by contact 7–R4. In order that selecting magnet STM3 shall not be released too quickly a release delay device in the form of a capacitor is connected to selecting magnet STM3 via contact 4–R3.

The forced release signals are transferred from the contacts on relay R9 (Figure 6) to relay R17 (Figure 8) over wire 19. Relay R21 which indicates in operated condition that busy or ringing tone has been received, receives current from relay R13 (Figure 3) via wire 20.

When a forced release signal is received and relay R17 operates, relay R18 is also energized via contacts 2–R17 and 1–R20 and operates, whereupon relay R19 is energized via contact 2–R18. Relay R4 is also energized by current via contacts 3–R18 and 2–R19. Then relay R20 is energized by current via contacts 4–R19, 5–R19, 3–R4 and 3–R20. Contact 1–R20 is opened, and relay R18 is released. Relay R4 is released when contact 3–R18 is opened. When relay R18 is released, selecting magnet STM5 receives current via contacts 9–R4, 5–R18, 6–R1 and 4–R21. Relay R4 receives current via contacts 2–STM5, 3–R19 and 2–R19 and operates. Selecting magnet STM5 opens contact 1–STM5 so that relay R19 is released. Both selecting magnet STM5 and relay R4 are hereby deenergized and released since contacts 6–R19, 2–R19 and 3–R19 are opened. If relay R21 had been in operated condition when the forced release signal was received, selecting magnet STM4 would have been operated by current via contact 3–R21 indicating that the operator had sent out the signal too early. Relays R17 and R20 are released when the forced release signal ceases. Thus the forced release signal is indicated by the operation of one holding bar without closure of any multiple spring group and operation of one holding bar under closure of a multiple spring group corresponding to selecting magnet STM4 or STM5.

In the case that the forced release signal is received by relay R17 at the same time as indication of a pulse train or current reversal is going on, the said signal can be stored by means of the circuit over contacts 3–R17, and 5–R20. Positive potential is applied to contacts 1–R17 and 2–R17 over series connected break contacts on relays R11, R15 and R3 (not shown in the figure).

In order that the crossbar switch K2 shall be able to accommodate indications of the required number of characteristics, the required number of holding magnets is as a rule greater than 10, which is the number of the holding magnets provided in an ordinary crossbar switch. Therefore a plurality of crossbar switches are joined. This can be done by connecting corresponding selecting magnets in the different switches in parallel or in series, or by providing a relay which operates in response to the operation of the last holding magnet in each switch so as to shift the circuits for the selecting magnets from one switch to another.

As regards the operation of switch V1d shown in Figure 10 reference is made to the description of the recording operations.

RECORDING OF INDICATIONS

The recording device R3 in Figure 1 is switched in when characteristics are received indicating that a permanent recording is to take place. Then the connection is maintained until the recording has been performed. In the present embodiment it has been assumed that initiation of a lasting recording is effected by indications in some of the devices according to Figure 3.

The recording can be effected in many different ways. Some of these ways will be described in the following.

The recording can be made in any of the following ways:

(1) by means of digit wheels and a stamping device, the positions of the digit wheels being stamped on a recording paper sheet.

(2) by printing of characters by means of a typewriter, teleprinter or the like with or without a perforator.

(3) by recording all characteristics on a tape or the like magnetically or in accordance with any arbitrary marking principle. When "playing off" these tapes or the like, the recordings can be transferred in a manner to be described below to written text by means of a typewriter or the like. This transfer can of course be made at any time after the recording.

The indicating devices are provided with switches V1a—V1e for the initiation of indications effected by these devices. The switches are operated step by step by a pulse device, and when information on an indication is received, recording of this indication takes place.

It will be assumed that the following kinds of information are to be recorded:

(1) Cause of recording.
(2) Member, e. g. register taken into use.
(3) Time indications, days, hours and minutes.
(4) Recording, disc and track.
(5) Digits received by the register.
(6) Digits transmitted from the register, and received current reversal and forced release signals.
(7) Recording of communication path, faulty switching member and faulty part of switching member.

In order to obtain these items of information the indicating devices have been provided with switches V1a—V1e.

Switch V1a indicates by means of wiper 1 on Figure 5 the cause of the recording. As mentioned above this indication is effected by the devices illustrated by Figures 3 and 4. Switch V1a further indicates by means of wipers 7—13 (not shown) the time of the recording, by means of wipers 2 and 3, Figure 11, the tracks of the disc, and by means of wipers 4 and 5 (not shown) the number of the disc.

Switch V1c, Figure 7, initiates digits received by the register which digits have been indicated on crossbar switch K1, Figure 7.

Switch V1d initiates indications made on crossbar switch K2, Figure 10, which indications consist of digits sent from the register and current reversals and forced release signals received from the register.

It is further assumed with reference to Figure 12 that the communication path is to be recorded, and that this is effected by means of tone recording or the like. Switch V1e initiates the communication path. After this information has been obtained another finder device is started for indicating the switching and connecting members included in the connecting circuit. Pulses from said finder device are transmitted to the recording device.

1. RECORDING BY MEANS OF DIGIT WHEELS AND STAMPING MAGNET

Figure 13 shows an arrangement in which the recording is effected by the digit wheels shown on the figure being rotated stepwise in response to indications made, the positions of the wheels being stamped by the operation of a stamping magnet. Then the wheels are restored, and the recording sheet is replaced or moved stepwise to receive a new recording. It is assumed that five different stamping operations are to be performed. The switch V1b is advanced one step for each stamping whereby relays R5—R9 are energized in turn. The operation of the relays results in the digit wheels being connected to the different indicating devices in accordance with a scheme suited to the system.

Below it has been assumed that the recording of the items of information previously mentioned are to take place in the following positions.

First down-stroke, relay R5 energized:
    Cause of recording.
    Member, e. g. register taken in use.
    Time indications, days, hours and minutes.
    Recording, disc and track.
Second down-stroke, relay R6 energized:
    Digits received by the register.
Third down-stroke, relay R7 energized:
    Digits transmitted from the register and current reversals and forced releases received from the register.
Fourth and fifth down-strokes, relays R8 and R9 energized in turn:
    Recording of the communication path, faulty switching member and faulty part of this member.

The recording is performed in the following manner. When any of the devices according to Figures 3 and 4 have indicated cause of recording, relay R8–5 is energized over the following circuit: positive pole—contact 1–R1(12)—wire 1 and contact 1–R7(5). The operation of relay R8 results in the following operations. The coil R9(5) is connected over contacts 3– and 4–R8 to wires a1, b1 towards the register whereby the connection is maintained until recording has taken place. Relay R5(13) is energized over contact 6–R8, wire 3, contact 22–R1(13) and switch V1b position 1. Relay R3(13) is energized over contact 7–R8 and wire 4.

When relay R5(13) operates, relay R10 on the same figure is energized over contacts 2–R4, 22–R5 and wire 5. Wire 5 receives positive potential from contact 2 on any of relays R1—R6(5), contact 3–R6(11), and on Figure 2 contact 2–R10 and any of contacts 10 on relays R1, R3 or R5. The operation of relay R10(13) causes the energization of relay R11 over contact 2–R10. Switch V1b is energized over contact 2–R11. The operation of the magnet of switch V1b does not cause any stepping action of the switch. Such an action takes place only when the switch magnet is released.

When relay R10(13) is operated, pulse relays R10—R12(5) are started over contact 3–R10, wire 6, and on Figure 5 contacts 3–R12 and 3–R11. The pulse transmission is effected in the following way. When relay R10(5) is operated, relay R11 is energized over contact 2–R10 whereby relay R11 breaks the current over contact 3–R11 to relay R10 which is then released. The release of relay R10 results in relay R12 receiving energizing current over contacts 1–R10 and 2–R11 whereby relay R12 operates. Relay R11 is released, and then relay R12 is also released by the opening of contact 2–R11.

When relays R11 and R12 have been released, relay R10 is energized again over contacts 3–R12 and 3–R11 whereupon the cycle of operations just described is repeated. Positive pulses are sent to switch V1a, Figures 2, 5 and 11, which is stepped in time with the pulses. The digit wheels are rotated step-by-step at the same time as the switch V1a in response to pulses over circuits in the devices according to the said figures. When any of the wipers of switch V1a find an indication made in the device, the stepping circuit of the corresponding digit wheel is broken. The positions of the digit wheels will obviously indicate in what position the switch has found the indication.

The magnet of switch V1a receives stepping pulses over 1–R11 and R12(13) and wire 8 to switch V1a(2).

*Setting of digit wheel 1 for indicating cause of recording (Figure 5)*

The digit wheel is stepped in response to current over contact 5–R11(5), any of contacts 1 on relays R1—R6, wire 101, contact 1–R5(13) and contact 1–R3. Wiper 1(5) of switch V1a receives positive potential over contact 2–R12(5), the winding of the same relay, wire 11, contact 21–R5(13) and wire 12. During the stepping of the switch, relays R1—R6(5) will thus receive positive potential over the said circuit. The stepping action of the switch goes on until an operated relay (R1—R6) is found. The negative potential at the operated relay causes relay R12(5) to be operated in response to current through winding II whereby the pulsing is interrupted and the stepping of the digit wheels and the switch ceases. The rectifier across the winding II of relay R12 reduces the voltage across this winding. The positive potential on the switch wiper causes the operated one among relays R1—R6 to be shunted and released. The release of the relay leads to the result that the circuit for stepping digit wheel 1 is broken at contact 1 on said relay, and that the negative potential is removed from the switch wiper by the opening of contact 4. Then relay R12(5) will be released whereupon the pulsing is started again. Since the stepping circuit for digit wheel 1 has been broken as described above, the repeated pulsing does not cause any new stepping of this digit wheel.

*Setting of digit wheel 2 for indicating the register taken into use (Figure 2)*

The digit wheel is stepped in response to current over contact 5–R11(5), wire 13, contact 1–R10(2), any of contacts 9 on relays R1, R3 or R5, wire 111, contact 2–R5(13) and contact 2–R3. Wiper 6 of switch V1a receives positive potential over contact 2–R12(5), the winding of the same relay, wire 11, contact 21–R5(13), wire 12, contact 4–R10(2) and the winding of relay R10. When the wiper during its movement finds an operated relay R1, R3 or R5, relay R10 will be energized. The pulsing is then interrupted in the manner described above by relay R12(5) receiving holding current, whereby the stepping of the digit wheels and the switch ceases. Upon the operation of relay R10(2) the stepping circuit for digit wheel 2 is broken at contact 1. The holding circuit for relay R12(5) is broken by the opening of contact 4, whereupon the relay is released and the pulsing is started again.

*Setting of digit wheels 3—6 for indicating recording disc for speech recording (Figure 11)*

In the device illustrated in Figure 11 for the indication of recording disc only the switch wipers 2 and 3 used for indicating the tracks of the disc have been shown. Information on the number of the disc is obtained over another two wipers 4 and 5 not shown.

When relay R8(5) operates, relay R6(11) is energized over contact 1–R8, wire 15, the winding of relay R6(11) and contacts 1–R4 and 1–R5. The operation of relay R6 leads to the result that relay R4 is connected to wiper 2 of switch V1a over contact 1–R6, and that relay R5 is connected to wiper 3 of the same switch over contact 2–R6. The digit wheel 3 is stepped in response to current over contact 5–R11(5), wire 13, contact 3–R4(11), contact 8–R6, wire 120, contact 3–R5(13) and contact 3–R3. The stepping circuit of digit wheel 4 is controlled by contacts 4–R5(11) and 7–R6. The circuits for stepping the digit wheels 5 and 6 are only indicated by wires 122 and 123 on the figure.

When switch wipers 2 and 3 during their movement find a wire with positive potential, showing the positions of switches V3 and V4, relays R4 and R5 are energized over contact 1–R6 and 2–R6 respectively. Holding circuits for the relays are established from positive potential over contact 2 on the respective relay. The operation of relay R4 causes contact 3–R4 to be broken, whereby the stepping of digit wheel 3 ceases. The stepping of digit wheel 4 ceases when relay R5 operates and opens its contact 4. When both relays R4 and R5 have operated, relay R6 is released by the opening of contacts 1–R4 and 1–R5.

Digit wheels 5 and 6 indicating the number of the disc are stepped and stopped in analogous manner.

Setting of time stamping can be effected by means of a switching device analogous to that described in connection with Figure 11. It is assumed that digit wheels 7—13 are required for this indication.

When all the digit wheels have been stepped into position for stamping in the first down-stroke, relay R10(13) is released by the removal of the positive potential from wire 5. This is effected by opening the following contacts: contact 2 on previously operated relay R1—R6(5), contact 2–R10(2) and contact 3–R6(11). The release of relay R10(13) results in the energizing current to the slow-releasing relay R11 being broken at contact 2–R10. During the release time of relay R11 recording magnet R2 and relay R1 receive energizing current over contact 1–R11 and 1–R10 and operate. On the operation of recording magnet R2 the positions of the digit wheels are stamped onto a paper sheet. The positive potential to pulse relays R10—R12 is removed when contact 3–R10 is opened but is applied again when contact 23–R1 is closed. When the slow-releasing relay R11 is released, the current to switch magnet V1b is broken by the opening of contact 2–R11. The switch magnet is released whereby the switch is advanced one step. The current to the recording magnet R2 and winding II of relay R1 is broken at contact 1–R11 whereby magnet R2 is released. Stepping of the digit wheels S1—S20 to their initial position is started when contact 3–R11 is closed. The circuit for the stepping current extends over contact 5–R11(5), wire 13, contacts 21–R1(13), 3–R11 and 1–R2, winding I on relay R1, contacts 1–20 on relay R1 and contacts 1 on all the digit wheels S1—S20. Relay R1 is locked during the stepping of the wheels. The rectifier across winding I on relay R1 reduces the voltage across the winding. Contacts 1 on the digit wheels are opened when the wheels arrive at their initial position. When all of the wheels have reached the lastmentioned position, relay R1 is released, and then the pulsing action of relays R10—R12 ceases due to the opening of contact 23–R1.

On the release of relay R1 relay R6 is energized over contact 6–R8(5), wire 3, contact 22–R1 and the wiper of switch V1b which is now in position 2. The digit wheels are now connected to the indicating device shown in Figures 6 and 7 for the recording of the indications made on this device.

*Down-stroke 2 for recording indications stored in the device according to Figures 6 and 7 indicating digits received by the register*

When relay R6(13) operates, relay R10 is energized over contacts 5–BRM1—BRM10(7), wire 30, contact 22–R6(13) and contact 2–R4. The operation of relay R10 leads to the result that pulse relays R10—R12(5) start pulsing in the manner described above due to the closure of contact 3-R10, and that relay R11 operates, which in turn results in the magnet of switch V1b being energized. Switch V1c(7) is stepped in response to current over contacts 1-R11 and 1-R12(5), wire 7, contact 23-R6(13) and wire 16 to the magnet of switch V1c(7). The digit wheels S1—S20 are rotated stepwise in response to current over contact 5-R11(5), wire 13, contacts 1-BRM1—BRM10(7), wires 150, 152, 153 etc., contacts 1-20 on relay R6(13) and the contacts on relay R3 mentioned in connection with the previously described switching operations. The wipers of switch V1c during the stepping action receive positive potential over contact 2-R12(5), the winding on the same relay, wire 11, contact 21-R6(13), wire 17 and contact 2 on switch V1c. During the operation of the switch the positive potential on the switch wipers will shunt the holding magnets BRM1—BRM10 over closed contact sets in crossbar switch K1. The switching operations for stepping the digit wheels are the same as those described in connection with the recording of indications made on the device according to Figure 5. When all the holding magnets have been released, relay R10(13) is released by the removal of the positive potential from wire 30. The release of relay R10 causes in the manner previously described stamping of digits set on the digit wheels, stepping of the wheels to their home positions and stepping of selector V1b to a new position.

*Down-stroke 3 for recording indications stored in the device according to Figures 8–9 and indicating digits transmitted from the register and received current reversal and forced release signals*

This recording is effected in the same manner as that described in connection with down-stroke 2. Stepping of the digit wheels takes place in response to current over wires 160, 161, 162 etc.

Recording has now been made of the following items of information:
(1) Cause of recording.
(2) Register taken into use.
(3) Time indications, day, hours and minutes.
(4) Disc and track of the same on which speech recording has been made.
(5) Digits received by the register.
(6) Digits transmitted from the register and received current reversal and forced release signals.

Furthermore speech has been recorded on a disc.
In certain cases these pieces of information are sufficient to make it possible to ascertain how and where in the connecting circuit the fault has occurred, but in other cases additional information is required. Thus it may be necessary to record the connecting path also. The nature of the fault determines to what extent the last-mentioned recording must be made. In some cases it may be sufficient to ascertain the communication path only, while in other cases it may be necessary to ascertain all the switching stages included in the traffic channel.

In the present embodiment, compare Figure 12, it has been assumed that only the communication path and the switching stages in the subsequent exchanges are to be recorded. It is further assumed that the indication of said path and stages is effected by means of tone recording or the like.

*Down-stroke 4 and 5 for the recording of the communication path and switching stages included in this path*

As has been mentioned previously the indication of the traffic channels from the recording exchange can be effected by applying a special voltage or tone to the circuit at this exchange, whereupon search for the traffic channel is performed by means of finder devices connected to all outlets from the exchange.

In Figure 12 the tone transmitting equipment and the switching stages in the own station are designated STN1 and the outlets therefrom Va—Vd. The finder device is shown as a switch SR1 connected to all the outlets and to a tone responsive testing device SL with a relay R4. Starting devices for the search for the connecting circuit at exchange STN2 and the transfer of signal characteristics for the recording of switching stages included in the connecting circuit at this exchange have been shown in the figure as relay R5—R7 at exchange STN1 and R8, R9 at exchange STN2.

The recording is effected in the following manner.
When down-stroke 3 has been performed as described above, switch V1b(13) is advanced one step to position 4. The relay R8 is energized in a circuit previously described. The operation of relay R8 leads to the result that tone frequency is applied over contacts 21-R8 and 22-R8 to wires a2 and b2 towards the output side of the register, that relay R10 is energized via contacts 2-R4 and 23-R8, wire 32 and wiper 3 of switch V1e, and that the magnet of the finder device SR1 is connected to pulse relay device R10—R12(5) over wire 7, contact 24-R8, wire 18, contact 3-R3(12) and contact 1-R4. The pulsing device R10—R12 which was started in the manner previously described on the operation of relay R10, steps the switch SR1. During the stepping action the switch connects the outlets Va—Vd to the tone frequency responsive testing device SL. When a connection carrying a tone has been found, the testing device is actuated and relay R4 is operated and stops the stepping of switch SR1 by opening contact 1-R4.

At the same time as switch SR1 is stepping pulses are sent over wire 170, contacts 1-SR1, 1-R3, 1-R6, wiper 1 of switch V1e to digit wheel S1. While this pulse train is being transmitted relay R3 and the control magnet of the switch are in operated condition. At the end of the pulse train relay R2 is released and the switch advances one step and connects digit wheel S2 over wire 171.

If the connection had been interrupted at the own exchange, the switch would have continued the stepping operation up to the initial position, and the relay R3 would have been energized and operated. When relay R3 is operated, finder device SR1 is disconnected, and another finder device (not shown on the drawings) for hunting within the own exchange is switched in over wires 60 and 61. Pulses from this new finder device are conveyed to the recording device via wire 61, contacts 2-R3 and 1-R6 and wiper 1 of switch V1e. The hunting continues within the own exchange over wires 60 and 61, pulses being sent to one digit wheel after the other eventually indicating where the connection has been broken.

It will now be assumed that the connection has been extended to another exchange. When the testing device is actuated and relay R4 is operated, relay R5 is energized over contacts 2-R4 and 4-R6. Then relay R6 is energized over contact 3-R5 whereupon this relay receives holding current over contact 5-R6. Relay R5 is released with some delay when relay R6 is operated, due to the opening of contact 4-R6. While relay R5 is in operated condition, a current pulse is sent over contact 2-R5 and line L to exchange STN2 where it energizes relay R9 over contact 2-R8 so that relay R9 is operated. The operation of relay R9 indicates that a search for the connection is to be made also at this exchange in the same manner as at exchange STN1. By the operation of the change-over contacts of relay R8 at station STN2 pulse trains can now be transmitted to relay R7 at exchange STN1 indicating along what path the connection has been extended over further exchanges or within exchange STN2. The pulses are conveyed over contacts 1-R7 and 2-R6 and wiper 1 of switch V1e to the digit wheels. Relay R2 which is in operated condition during the pulse trains and is in released condition during the intervals between the pulse trains, advances switch V1e one step for each digit train, so that one digit is obtained on each digit wheel.

When all the digit wheels have been actuated, a circuit is established over wiper 2 of switch V1e which causes, e. g. by operation of a relay (not shown in the drawings), restoration of switch V1e, stamping and restoration of the digit wheels and possibly the operation of relays R9(13) or relay R4 in a manner previously described.

The recording ceases when pulses over contact 2–R6 cease, so that relay R2 remains in released condition whereby relay R1 is released. Then relay R8(5) is also released whereby all switching members taken into use are restored.

Alternatively relays R8(13) and R9 can be used on the recording of indications from switches or relays within the own exchange e. g. the number of engaged switching members at the time of the recording. Then relay R4 should be in operated condition all the time when the traffic channel is being recorded.

An indication showing that the connecting circuit has been extended from one exchange to another should be recorded in a manner different from that in which an indication showing that the connection has been broken within the first exchange is recorded. This can be accomplished by means of a special signal sent out over the selective network.

2. RECORDING BY MEANS OF A TYPEWRITER, TELEPRINTER OR THE LIKE

The recording device according to Figure 13 can advantageously be replaced by the device according to Figure 14. This consists of a typewriter the keyboard of which has been provided with electromagnets, one for each key, which magnets when energized actuate the corresponding keys. Three such magnets are shown in the figure. The stepwise travel of the platen should be effected automatically as in electric typewriters or in the same manner as in printing telegraph receivers (telex receivers), i. e. a spring is tensioned step by step during the travel of the platen caused by the actuation of the keys, and when it has reached the end position the spring force thus obtained is utilized to return the platen.

The pulsing device consisting of relays R10—R12 is analogous to that described with reference to Figure 5. The recording according to Figure 14 is assumed to be effected from two cross-bar switches K1 and K2 (see Figures 7 and 10), relays R1, R3 and R5 (see Figure 2) and from a rotary switch V4 (see Figure 11).

The recording is started by the application of positive potential to wire 31 over a contact (not shown) of relay R8(5) on the operation of that relay. The pulse relays then operate in the manner previously described. The multiple contacts on switches K1, K2, V4 and contacts 1 on relays R1, R3 and R5 are connected to a multiple M. Each of the wires from this multiple is connected to a separate typewriter magnet. When wiper 1 of switch V1f receives current from contact 3–R10, the topmost contact bar of crossbar switch K1 receives current, whereby that typewriter magnet is energized whose corresponding contact in crossbar switch K1 is closed. After operation of relays R11 and R12, wiper 2 of switch V1f also receives current and shuts down the topmost holding magnet in crossbar switch K1 so that this magnet is released. Then relay R12 is released, switch V1f is advanced one step and connects itself to the next topmost contact bar of crossbar switch K1. Then the same cycle of operations is repeated so that the corresponding typewriter magnet is energized and the second holding magnet is released.

When switch V1f is advanced to the next position, crossbar switch K2 is connected and the operations described above are repeated. The relay device R1, R3 and R5 is connected when switch V1f is advanced another step. Hereby a typewriter magnet is energized over contact 1 on an operated relay R1, R3 or R5. Relay R10 is energized over wiper 2 of switch V1f and breaks the circuits to wipers 1 and 2 of V1f, so that switch V1f can advance still another step. Finally switch V1d is connected to the wiper of switch V4 so that the setting of the latter can determine the energization of a desired typewriter magnet. Then relay R4 is energized from wiper 2 to V1f, whereby relay R12 can be released again and switch V1d can be stepped again and record a desired number of indicated current characteristics.

It is important that the recording be effected as rapidly as possible, partly because the less the recording time is, the less the seizure time of the system according to the invention will be, but above all because when a connecting circuit extends through a plurality of exchanges, the number of recordings becomes very large, and then there is risk that the recording cannot be completed before the time supervision means have come into action at some part of the connecting circuit and released some of the members included in the connection which members should have been recorded.

Of the recording devices shown in Figures 13 and 14 the embodiment according to Figure 14 is the speediest one. However the scanning switch V1f shown in Figure 14 can be made considerably quicker in operation if it is designed to be driven at maximum speed and to be stopped on each key stroke on the typewriter. Then the switch should not be driven by a pulsing device but should perform a hunting action and be stopped by means of a testing device on actuation of the keys.

The recording speed can be further increased if the scanning device according to Figure 14 (R10, R11, R12 and V1f) is replaced by an electronic switching device according to Figure 15. Then the right-hand part of the arrangement according to Figure 14 is unchanged and therefore it has not been shown in Figure 15.

In Figure 15 there are shown magnets R120—R122 for the actuation of the keys of a typewriter or the like. The scanning switch is of the electronic type as stated above, and has cold cathode tubes of which Tr1—Tr3 are shown but of course it may consist of any type of electronic switch suited for the purpose. The tubes in known manner comprise a cathode $k1$ and a collector $k2$ for the ignition of the tube, the cathode $k3$ and the collector $k4$ for connection of the respective magnet (R120—R122).

The tubes are connected in known manner so as to be ignited in turn, first Tr1, then Tr2, then Tr3 and so on. Tube Tr1 is only used to start the scanning device. The other tubes Tr2, Tr3 etc. are equal in number to the number of not lastingly recorded characteristics. In the arrangement according to Figure 15 this number is determined by the number of the conductors $m1$—$m10$.

Since the tube circuit is known per se, it will only be described in the following with reference to its operation. When voltage source E1 is switched in, the collector $k2$ in tube Tr1 receives a transient current via capacitor C10 and resistor R15 so that tube Tr1 is ignited. Then current will pass through the tube and the resistor R15 so that capacitor C10 is charged. When this capacitor has been charged to a sufficiently high voltage, which is applied to collector $k2$ in tube Tr2 via resistor R11, tube Tr2 is ignited. Then the current through resistor R15 is increased so that the collector voltage of tubes Tr1 and Tr2 is reduced. Since capacitor C10 is now substantially fully charged, collector $k2$ in tube Tr1 does not receive any appreciable potential, and therefore tube Tr1 is extinguished.

When tube Tr2 is ignited, collector $k2$ in tube Tr3 receives a voltage from capacitor C13 and resistor R13 via resistor R12, and consequently tube Tr3 is ignited. When tube Tr3 is ignited, tube Tr2 is extinguished and so on. By suitable dimensioning of the tubes and the circuit elements the scanning may alternatively be controlled by means of pulses on conductor 198.

It is now assumed that conductor $m1$ is connected in the manner described above over a contact for non-lasting recording to conductor m100. When tube Tr2 fires, the following circuit is established: positive terminal of voltage source E1, resistor R15, collector electrode k4 and cathode k2 in tube Tr2, conductor m1, contact on indicating device, conductor m100, winding on relay R9, contact 1–R10, voltage source E2, negative terminal of voltage source E1. Hereby cathodes k1 and k3 in tube Tr2 receive negative potential with respect to earth, since the cathode k3 receives negative potential from voltage source E2. It is of course presupposed that cathodes k1 and k3 are interconnected or combined into a common cathode. Tube Tr2 is kept fired by a voltage from the series-connected voltage sources E1 and E2 in the said circuit.

The common relay R9 which is relatively sensitive and quick in operation, operates although the resistor R15 is effective in the circuit. When relay R9 is being energized and resistor R15 is still effectively included in the circuit, tube Tr1 is extinguished. When relay R9 operates, resistor R15 is short circuited by contact 1–R9. Hereby the current through tube Tr2 is considerably increased so that control magnet R120 is operated. Relay R10 is operated at the same time as magnet R121 by current via contact 2–R9. When relay R10 operates, voltage source E2 is disconnected at contact 1–R10. Hereby the energizing circuit for magnet R120 and relay R9 is interrupted, and magnet R120 and relay R9 are de-energized very rapidly whereby relay R9 is released and connects resistor R15 into the circuit again. Capacitor C13 and resistor R13 are shunted by contact 2–R10, and therefore tube Tr3 cannot be fired for the time being. The time of operation of relay R10 is chosen at least as large as that of magnets R120–R122 so that contact 1—R10 does not break the circuit from voltage source E2 until magnet R120 has been safely operated.

The current to relay R10 is broken at contact 2–R9 when relay R9 is released. Then contact 2–R10 is opened a short time before contact 1–R10 is closed so that tube Tr3 fires and tube Tr2 is extinguished before the "testing circuit" over the m-wires is switched in again. If contacts are closed in said testing circuit, a control magnet is operated again and the operation described above is repeated. If contacts are not closed in the testing circuit, the scanning is continued in the manner likewise described above.

3. Recording by Means of Tapes or the Like

The tape recording apparatus should preferably be provided with a plurality of recording members (recording heads in magnetic tape recorders). For the recording of characteristics applied to a register a high-resistance recording member is preferably connected between the a-wire and earth and another recording member is connected between the b-wire and earth. By these two members together all current characteristics such as pulsing, current reversals, application of negative potential or earth to the a- and b-wires, are recorded. The duration of these characteristics e. g. the pulse ratio, is also recorded. Of course the recording members must be designed so as to allow recording of direct current functions.

Recording of the set position of switches V1, i. e. the number of the register, the number of the line etc., is preferably done after all the other recordings have been finished by transferring the numbers in known manner into pulse trains which are recorded.

Preferably there are provided two recording members for the recording of characteristics applied to the register, two recording members for the recording of characteristics supplied by the register, one recording member of normal speech recording, and one recording member for the recording of pulses indicating the connecting route and derived e. g. by tone tracing as described in patent application No. 415,092, D. V. L. Lindström and A. G. G. Cronsten, filed March 9, 1954.

On reproduction of the recordings of different characteristics such as pulses, current reversals etc., the amplification must be effected by means of so called direct current amplifiers the output circuits of which are connected to indicating members corresponding to relays R1 and R9 in Figure 6 and R22 in Figure 8. Then the recorded pulse trains will of course be recorded on relays corresponding to the selecting relays STM in Figures 7 and 10, whereupon the magnet for the actuation of the corresponding key is energized on the release of relays corresponding to relays R3 in Figures 6 and 9. Since recording has been made by a number of groups of recording members, the reproduction can be made on an equal number of devices, e. g. computing machines of the addition type, simultaneously in order to save time. The duration of various characteristics is preferably reproduced by means of oscillographs or pulse recorders of known type.

Different recordings can be separated either by spaces or by the printing of predetermined characters. Of course the shifting device of the typewriter may also be utilized, the said shifting device being operated by a special magnet the energizing circuit of which is controlled by contacts in the indicating devices.

Instead of a typewriter a start-stop apparatus, teleprinter or similar apparatus with or without a perforator could be used.

The current to the recording head R60 in Figure 4 of the speech recording apparatus is preferably amplified by means of an amplifier according to Figures 16 and 17 which is so designed that large amplitudes originating from dial pulses, current reversals and the like are amplified considerably less than the speech currents having small amplitudes, so that amplitude distortion is avoided. Hereby speech recording as well as recording of signal characteristics can be made on the same recording member.

The amplifier consists of an input transformer TR1, an output transformer TR2, two electronic tubes R1 and R2, two rectifiers L20 and L21, four resistors r20—r23, a grid bias source EP1 and an anode voltage source EP2. A grid bias is supplied by source EP1 as will be seen from Figure 17 in such manner that when amplifying small amplitudes the tubes work on the straight portion of the anode current-grid voltage characteristics but when amplifying large amplitudes on the bent portion, designated a in Figure 17. By means of rectifier L20 one half cycle of the alternating current is removed and by rectifier L21 the other half cycle. Thus tube E1 will amplify one half cycle (H1) and tube E2 the other half cycle (H2). As will be seen from Figure 17 large amplitudes will be amplified considerably less than small ones when combined in the output transformer TR2.

On the reproduction of the recordings the original amplitudes can be restored by means of an amplifier designed to operate in the reversed manner as compared with that described with reference to Figures 16 and 17, i. e. it should be designed to amplify the large amplitudes more than the small amplitudes. Such an amplifier may be similar to that shown in Figures 16 and 17, but the grid bias should have a small value, EP3 in Figure 17, and rectifiers L20 and L21 should be reversely poled, so that the large amplitudes appear on the straight portion of the tube characteristics.

4. Release of the Supervisory Equipment

As will appear from the foregoing description recording is only effected in response to certain indications controlled by the devices according to Figures 3a–3e, while other indications, e. g. indications of digits transmitted and received by the register do not initiate recording. In the case that no indications initiating recordings occur, the supervisory equipment should be released from the register after a relatively short time so that it becomes available to another register. As a signal indicating that release shall take place, tone signal transmission on the connection can be utilized in this case. Since a signal tone, e. g. ringing tone, causes the operation of relay R23(4), the energizing current of relay R25(4) is interrupted at contact 1–R23 so that relay R25 is released and in turn closes an energizing circuit for relay R26 over contact 1–R25. Relay R26 is operated and receives holding current over contact 1–R26. An energizing circuit for the slow-operating relay R27(4) is then closed over contact 2–R26, wire 36 and break contact 9R8(5) which is closed in this case because R8 is only operated when recording is to take place. When operated, relay R27 breaks the holding circuit over contact 1–R9(2) and wire 35 for relay R5 at contact 1–R27(4) so that relay R5(2) is released and disconnects the register at contacts 1–R5—4–R5. Then relays R1(6) and R1(9) are deenergized and released whereby they in turn cause the release of relays R2(6) and R2(9) which at their make contacts 3–R2(6) and 3–R2(9) disconnect positive potential from all the wires marked with a plus within a circle, whereby all the switching means are restored to their rest position.

The release delay time of relay R27(4) should be so chosen that tone signal indications can be brought about in the devices according to Figures 3a, 3c and 3d, and for this purpose a delay of about two seconds is usually sufficient. If it is also desired that it shall be possible to obtain indication and recording of repeated ringing signals or of a brief conversation (Figure 3b), the delay time must be considerably longer. Therefore it may be advantageous to use adjustable delay means in order to secure the time interval required in different cases between the first incoming tone signal and the disconnection of the register from the supervisory equipment.

In the case that recording takes place, relay R8(5) is operated as stated above, so that in this case the release of relay R25(4) does not cause release of the supervisory equipment, since relay R27(4) is prevented from being energized due to the opening of break contact 9R8(5). Instead the release of the supervisory equipment is then effected under control of relay R1(12). When the latter relay is released in the manner previously described, the energizing circuit over wire 1 for relay R8(5) is broken so that relay R8(5) is released. Then the energizing circuit for relay R27(5) is closed at contact 9–R8(5), and when this relay is operated, release of the supervisory equipment is effected in the manner previously described.

Figure 18 shows an exchange area layout in which the main exchanges are designated F and N. The exchanges designated F may be called long distance transit exchanges, and those designated N short distance transit exchanges. The area according to Figure 18 is divided into four large zones with the long distance transit exchanges F1, F2, F3 and F4. Each such large zone is divided into smaller zones each having a short distance transit exchange except the zone where the long distance transit exchange is located, the latter exchange serving also as short distance transit exchange for that zone. Thus the large area in which exchange F1 is located, has two smaller zones in which the short distance transit exchanges N1 and N2 are located. To these exchanges are connected in known manner group centres, junction centres and district exchanges of which two exchanges G1 and G2 connected to exchange N1 are shown in Figure 18. A subscriber ab1 connected to exchange G1 is also shown in the figure. In similar manner minor exchanges G3 and G4 and a subscriber ab2 are shown connected to exchange F3.

Figure 19 shows over which exchanges a subscriber ab1 can be connected to a subscriber ab2. It will be seen from Figure 18 that said subscribers may also be interconnected over other exchanges. Such alternative connections can be used when all junctions between two exchanges are engaged, it being thus necessary to choose a route having idle junctions available.

In the manner described the supervisory system checks whether there is reason to make a fault recording whereupon the connecting path is found and recorded e. g. by means of a typewriter or the like. The finding operation is preferably carried out by means of tone tracing principally in the manner described in patent application Serial No. 415,092, filed March 9, 1954 by D. V. L. Lindström and A. G. G. Cronsten. Thus if the supervisory system at exchange F2 has found that there is reason to make a lasting record on a connection extending over station F1, tone is applied to this connection at exchange F2, preferably at the output side of the register which has been taken into use for the connection. Then the tone tracing device at F2 is started and finds out that the connection extends to exchange F1 and records this fact.

According to the present invention the recording equipment at exchange F1 is also switched in. If the connection extends to still another exchange having a recording equipment, e. g. exchange N1, the recording at the latter exchange is likewise switched in. Hereby the personnel who are to locate and remedy the fault, receive information from the recording equipment belonging to their working area, whereby transfer of the readable information from one area to another is made unnecessary. As will be described more in detail below, each of the recording equipments needs only be switched in for a short time. If as stated above a connection extends from exchange F2 over exchange F1 to exchange N1, the recording equipment at F1 is switched in, whereupon the recording equipment at F1 can be disconnected when the recording equipment at N1 has been switched in. As will be seen from Figure 18, it may happen that tone is applied not only to the connection from F2 to F2 as mentioned above by way of example, but also to other connections to F1, e. g. one from N1 and one from N2. Obviously the recording equipment at exchange F1 cannot record all these connections simultaneously but must be used to record one connection at a time. One of the main objects of the present invention is to provide means for recording one such connection at a time and performing in the different recording equipments recordings containing such information that the different recordings belonging to one and the same connection can be put together. This can e. g. be accomplished thus, that when the recording equipment at exchange F1 in the example mentioned above takes over the recording from exchange F2, the recording equipment at exchange F2 transfers a designation e. g. a number, to the recording equipment at exchange F1, which designation indicates to which connection the records relate.

In order to solve this problem steps have been taken to the effect that only one tracing tone at a time can be sent to each exchange having recording equipment. Thus when a tone is sent from exchange F2 and it has found that the connection extends to exchange F1 and that a call has been made on the control circuit between exchanges F2 and F1, exchange F1 marks busy all other control circuits, unless tone tracing is already going on or is being initiated at exchange F1. In the latter case the connection between F2 and F1 is marked busy which is preferably recorded by the recording equipment at exchange F2. In order that it shall be possible to transfer the required signal characteristics between the different main exchanges which have recording equipments, a special signal repeater shown in Figure 20 has been developed which is of the two-way type and can be used for the transmission of signals in either direction.

The signal repeater according to Figure 20 consists of relays R3—R9 at each exchange and two auxiliary relays R1 and R2. In the following description it will be assumed that one repeater is located at exchange F2 and therefore the designations of its relays will be preceded by numeral 2. Thus relay R1 at exchange F2 is designated 2R1. In analogous manner the relay R1 belonging to exchange F1 is designated 1R1. Relays 1R4 and 2R4 are of the polarized type. The other relays are ordinary electromagnetic relays.

In the case of busy marking and calls outgoing from exchange F2 to exchange F1, relays 2R3, 2R4, 2R9, 1R7, 1R6 and 1R2 will be taken into use. Similarly relays 1R3, 1R4, 1R9, 2R7, 2R6 and 2R2 will be taken into use in the case of busy marking and calls from F1 to F2. The rectifiers connected in series with the windings of relays 2R6 and 1R6 prevents in known manner these relays from being operated in the case that there is a potential difference between the earth points of the two exchanges.

It is a further characteristic of the present invention that a device according to Figure 21 is connected to the registers at each exchange having recording facilities. The object of this device is to prevent disconnection of a register in a connection at least until the fault indicating equipment has ascertained whether recording should be performed or not. In the case that recording is not to be effected, the register as well as the maintaining equipment is released. If on the other hand a recording is to be made, the register is maintained connected either by means of a device according to Figure 21 or by means of the tone tracing equipment as long as necessary to obtain the desired record, e. g. the number of the register and information stored in the register which may be of value for the localization of a fault.

Holding of a register is accomplished according to the present invention by applying a signal tone to the speech connection preferably at the output side of the register. This signal tone should have a frequency different from that of the tone used for finding the connecting path. At the exchange where the supervisory system is located the register is held by special holding contacts in the manner described above. In the following the tone for holding the registers will be called register tone. When this tone is applied to a connection from exchange F2 to exchange F1, the device according to Figure 21 at exchange F1 will be put into operation and prevent the register included in the connection from being disconnected.

The device according to Figure 21 is shown for two connections $Va$ and $Vb$ to registers $Re1$ and $Re2$ and consists of an amplifier F10 which is selectively responsive to the register tone having the frequency $f1$, a switch V5 having selecting segments $v1$ and $v2$ and driving means VR, relays RR1 and RR2, a pulsing device $Imp1$, capacitors C20 and C21, and finally a relay with an associated capacitor for making the relay slow-acting for each register, namely $RRe1$ for register $Re1$ and $RRe2$ for register $Re2$.

Normally contacts 1 of switch V5 are closed and contacts 2 open. Then relay RR2 is in operated condition, and capacitors (C20, C21) having low capacity are connected from each register to amplifier F10, so that when tone is applied to a register, amplifier F10 receives an input voltage of frequency $f1$, and relay RR1 is operated. Then pulsing device $Imp1$ is started and causes switch V5 to operate step-by-step.

When switch V5 leaves the home position, its contact 1 is opened so that relay RR2 is released and interrupts the common circuit over the capacitors to the input sides of the registers. Relay RR1 is released. When during its movement switch V5 finds a register on which tone is present, a tone is transmitted to amplifier F10 so that relay RR1 is operated and energizes the individual relay belonging to the register. The last mentioned relay will then hold the register in known manner by its contact 1 and applies register tone by means of its contacts 2 and 3 to the connection to the next exchange, so that if the latter is provided with recording equipment, its register is held and so on. The delay time of the individual relays of the registers is so chosen that switch V5 will have time to scan all the registers during the delay time. The switch will be operated step by step in the manner described above and apply a pulse to the individual relays during each scanning cycle so that the relays remain in operated condition as long as register tone is transmitted. In the case that no register has tone, the switch stops in the home position since relay RR1 remains released. In order that switch V5 shall continue to move round to its home position when it has once started its movement, its contact 2 is connected to pulsing device $Imp1$.

It will be now assumed that a connection extending from exchange F2 to exchange F1 is to be checked and recorded. When the supervisory equipment is connected to the connection at exchange F2, register tone is applied to the line wires at the output side of the register so that registers at other exchanges to which the connection is eventually extended, are also held.

This tone transmission can be effected e. g. by contacts on the connecting relay (R1, R3, R5, Figure 2) of the respective register.

The register is held connected at exchange F2. It will further be assumed that the supervisory equipment then records a fault on the connection, whereby tracing tone is applied to the output side of the register at the same time as the hunting for tone carrying switching members within exchange F2 is started. According to the present invention outgoing lines to exchanges having supervisory means should be connected to the switch for tone tracing (SR1) whereby the connecting path to the next exchange is rapidly found.

At the same time as tracing tone is transmitted on the connection, the control wires to all exchanges having supervisory means are marked busy. This is effected by the operation of the relays R9 (Figure 20) in all control wires leading to exchanges having supervisory means. In Figure 20 an auxiliary relay R1 has been provided which when operated applies current to all relays R9 when the tone tracing starts. Relay R1 in turn is energized when the tone tracing starts. In the signal repeater the relatively high resistance $2r1$ is then switched in whereby the sensitive relay R6 in exchange F1 is operated. All relays R6 are connected to a common relay R2 which is provided with contacts which prevent tone tracing at the respective exchange. Hereby it is avoided that tracing tone is transmitted to exchange F2 during the time when hunting for a tone carrying connection is going on at the latter exchange. This is necessary because a tone eventually sent from another exchange e. g. F4 might cause connection of the finder to the connection to F4 which is not desired in this case.

When the finder device at exchange F2 finds the connection to exchange F1, relay 2R3 Figure 20 is operated, and then the resistor $2r1$ is short circuited so that relay 1R7 at exchange F1 also is operated. The busy condition of the control circuit is now changed to call condition. The tone tracing at exchange F1 is started over contacts on relay 1R7. At the same time exchange F1 marks busy all control circuits to other exchanges having supervisory means, so that only one tracing tone is present at exchange F1. When the finder at exchange F1 has found the connection to exchange F2, relay 1R8 is energized whereby current reversal takes place on the wires of the control circuit to exchange F1. The circuit to relay 1R8 is controlled on one hand over contacts in dependence of the position of the tone tracer, i. e. by the operation of relay 1R7, and on the other hand in response to a tone received from the tone tracer at exchange F1. Then the armature of the polarized relay 2R4 is moved in the direction determined by the current direction now existing in the control circuit. From exchange F1 a code signal is now sent in known manner which code signal indicates the number of the recording at exchange F1. The code signal is transmitted by pulsing of relay 1R8 and thus also relay 2R4. Recording is effected over contacts on the last mentioned relay, e. g. by the operation of typewriter keys. When this code signal has been transmitted, relay 1R5 is energized whereby the current over the control circuit is interrupted so that relay 2R4 is released indicating that the recording equipment at exchange F2 may be released and that the recording equipment at exchange F1 has taken over the recording. When relay 1R5 has been in operated condition for a sufficiently long time to permit the safe release at exchange F2, the current to relay 1R8 is broken whereupon resistor 1r1 is connected to the control circuit so that busy marking of the latter is obtained at exchange F2 indicating that for the time being tone tracing must not take place at exchange F2 to exchange F1.

Then the same cycle of operations is repeated at exchange F1 as that described above with reference to exchange F2. Thus when a main exchange, e. g. N1, connected to exchange F1 has taken over the recording, the recording equipment at exchange F1 is released and so on.

In the case that the connection extends to or over such exchanges which have not supervisory means, the tone tracing is continued in known manner. However, then the control circuits to exchanges having supervisory means need not be marked busy, for the registers belonging to connections under supervision are held by means of devices according to Figure 21, whereby tracing tone at the input side of a register is not transferred to the output side of the register. Disturbing tracing tone to satellite exchanges is thus prevented. The registers eventually provided at the satellite exchanges must of course be bridged by capacitors or filters so that tracing tone can be conveyed around the registers.

In the case of so called traverse circuits between different satellite exchanges and between such exchanges and main exchanges the application of tone to possible connections to a satellite exchange must be prevented by busy marking of the control circuit, for otherwise more than one tracing tone at a time might be present at such a satellite exchange.

In the manner described especially in conjunction with Figure 12 finding of a communication path can take place on one hand within the exchange where the recording equipment is located and on the other hand in other subordinated or satellite exchanges to which control circuits are extended and which are further provided with a switch for tone tracing. In the case that connections from the latter exchanges are to be checked also, such exchange may be provided with a supervisory device, eventually of simplified design, which indicates the cause of a fault whereupon this device applies tone to the connection. This tone may be obtained either from a tone generator belonging to the exchange in question or via a line from the nearest exchange having recorded means. During the search for the connecting path from the respective satellite exchange to the nearest exchange having recording equipment pulses are transmitted over the control circuit to the main exchange in a manner analogous to that described in conjunction with Figure 12 so that a readable recording is effected at said main exchange.

We claim:

1. An arrangement in an electric communication system containing a plurality of exchanges including means for establishing telecommunication connections through the exchanges selectively operable in response to controlling signals, supervisory equipment for detecting faulty operation selectively connectable to lines forming part of said communication connections running through said exchanges comprising indicating means operable in response to switching signals transferred through said lines for the establishment of a communication connection to the called subscriber's station and to signals provided by said called station upon establishment of said communication circuit, and recording means including recording members selectively operable in response to the conditions of said indicating means for recording the conditions of the indicating means on a recording medium, said indicating means being arranged to be rendered operative for recording on the recording medium in response to predetermined factors as detected by said indicating means.

2. The arrangement as defined in claim 1 wherein said indicating means includes means operable in response to ringing and busy tone signals present on the communication connection and time measuring means controlled thereby, said time measuring means being responsive to the time interval between consecutive tone signals to differentiate between different types of tone signals and means operable in response to the presence of a predetermined tone signal for rendering said recording means operative.

3. The arrangement as defined in claim 1 wherein said indicating means further includes means operable in response to tone signals characteristic of conditions on said lines and frequency sensitive means controlled thereby, said frequency sensitive means being responsive to different frequencies for rendering said recording means operative.

4. In a telephone system including calling and called subscriber's lines, connecting lines, switching means for selectively connecting to said connecting lines calling and called subscriber's lines and for interconnecting said connecting lines, controlling means for controlling the operation of said switching means, and means associated with said switching means operable in response to conditions appearing on said lines for transmitting tone signals characteristic of conditions on the lines in the backward direction towards the calling subscriber's lines, a supervisory device and means for connecting said supervisory device to a connecting line in response to a call incoming to the respective connecting line, said supervisory device comprising first indicating switching means operable in response to switching signals caused by said controlling means and second indicating switching means operable in response to tone signals caused by said means operable in response to conditions appearing on said lines, said supervisory device further comprising recording means optionally energizable for permanently recording the settings of said first and second indicating switching means.

5. In a telephone system as claimed in claim 4, in which said supervisory device includes a sending means for transmitting an alternating voltage to the respective connecting line, hunting means successively connectible to different connecting lines and comprising switching means responsive to the appearance on a connecting line of alternating voltage transmitted from said sending means, means selectively operable in response to the setting of said hunting means and recording means in said supervisory device operated by said means operated in response to the setting of the hunting means for permanently recording the setting of said hunting means.

6. In a telephone system including calling and called subscriber's lines, connecting lines, switching means for selectively connecting to said connecting lines calling and called subscriber's lines and for interconnecting said connecting lines, controlling means for controlling the operation of said switching means, and means associated with said switching means operable in response to conditions appearing on said lines for transmitting tone signals characteristic of conditions on the lines in the backward direction towards the calling subscriber's lines, a supervisory device and means for connecting said supervisory device to a connecting line in response to a call incoming to the respective connecting line, said supervisory device comprising first indicating switching means operable in response to switching signals caused by said controlling means and second indicating switching means operable in response to tone signals caused by said means operable in response to conditions appearing on said lines, said supervisory device further comprising recording means for permanently recording the settings of said first and second indicating switching means, said recording means being operative for providing permanent record in response to a predetermined condition of said second indicating switching means.

7. In a telephone system including calling and called subscriber's lines, connecting lines, switching means for selectively connecting to said connecting lines calling and called subscriber's lines and for interconnecting said connecting lines, controlling means for controlling the operation of said switching means, and means associated with said switching means operable in response to conditions appearing on said lines for transmitting ringing and busy tone signals in the backward direction towards the calling subscriber's lines, a supervisory device and means for connecting said supervisory device to a connecting line in response to a call incoming to the respective connecting line, said supervisory device comprising first indicating switching means operable in response to switching signals caused by said controlling means and second indicating switching means operable in response to tone signals caused by said means operable in response to conditions appearing on said lines, said supervisory device further comprising recording means for permanently recording the settings of said first and second indicating switching means, delayed action switching means initiated for operation in response to the operation of said means for connecting the supervisory device to a connecting line and restored in response to the operation of a predetermined one of said indicating switching means, said recording means being operative for providing a permanent record through the operation of said delayed action switching means.

8. In a telephone system including calling and called subscriber's lines, connecting lines, switching means for selectively connecting to said connecting lines calling and caled subscriber's lines and for interconnecting said connecting lines, controlling means for controlling the operation of said switching means, and means associated with said switching means operable in response to conditions appearing on said lines for transmitting ringing and busy tone signals in the backward direction towards the calling subscriber's lines, a supervisory device and means for connecting said supervisory device to a connecting line in response to a call incoming to the respective connecting line, said supervisory device comprising first indicating switching means operating in response to switching signals caused by said controlling means and second indicating switching means operating in response to tone signals caused by said means operable in response to conditions appearing on said lines, said supervisory device further comprising recording means for permanently recording the settings of said first and second indicating switching means, delayed action switching means initiated for operation in response to one operation of said indicating switching means and restored in response to a subsequent operation of the last-mentioned means, said recording means being operative for providing a permanent record through the operation of said delayed action switching means.

9. In a telephone system including calling and called subscriber's lines, connecting lines, switching means for selectively connecting to said connecting lines calling and called subscriber's lines and for interconnecting said connecting lines, controlling means for controlling the operation of said switching means, and means associated with said switching means operable in response to conditions appearing on said lines for transmitting ringing and busy signals in the backward direction towards the calling subscriber's lines, a supervisory device and means for connecting said supervisory device to a connecting line in response to a call incoming to the respective connecting line, said supervisory device comprising first indicating switching means operating in response to switching signals caused by said controlling means and second indicating switching means operating in response to tone signals caused by said means operable in response to conditions appearing on said lines, said supervisory device further comprising recording means for permanently recording the settings of said first and second indicating switching means, said second indicating switching means being associated with a stepping relay adapted to be advanced a step for each operation of the associated second indicating switching means, means responsive to a predetermined number of stepping operations of said stepping relay for operating said means for permanently recording the settings of said first and second indicating switching means.

10. In a telephone system including calling and called subscriber's lines, connecting lines, switching means for selectively connecting to said connecting lines calling and called subscriber's lines and for interconnecting said connecting lines, controlling means for controlling the operation of said switching means, said controlling means including a digit receiving and resending register, means for connecting said register to a connecting line in response to a call incoming to the respective connecting line, and means associated with said switching means operable in response to conditions appearing on said lines for transmitting tone signals characteristic of conditions on the lines in the backward direction towards the calling subscriber's lines, a supervisory device and means for connecting said supervisory device to the respective connecting line through said register, said supervisory device comprising first indicating switching means operating in response to switching signals caused by said controlling means and second indicating means operating in response to tone signals caused by said means operable in response to conditions appearing on said lines, said supervisory device further including recording means for optionally permanently recording the settings of said first and second indicating switching means.

11. The telephone system as defined in claim 10 wherein said recording means is operative to provide a permanent record in response to a predetermined condition of said second indicating means.

12. The telephone ssytem as defined in claim 10 further including delayed action switching means operative in response to the operation of said means for connecting the supervisory device to a connecting line and restored to its initial condition upon operation of a predetermined one of said indicating means.

13. The telephone system as defined in claim 10 further including delayed action switching means initiated for operation in response to one operation of one of said indicating means and restored in response to a subsequent operation of said indicating means and connected to control energization of said recording means.

14. The telephone system as defined in claim 10 further including a stepping relay associated with said second indicating means and adapted to be advanced a step for each operation of said second indicating means, and means operated through the appearance of a predetermined number of stepping operations of said stepping relay for energizing said recording means.

15. In a telephone system including calling and called lines, connecting lines, switching means for selectively connecting to said connecting lines calling and called subscriber's lines and for interconnecting said connecting lines, controlling means for controlling the operation of said switching means, said controlling means including a digit receiving and resending register, means for connecting said register to a connecting line in response to a call incoming to the respective connecting line, means for ordinary disconnection of the register in response to the completion of the digit sending from the register, and means associated with said switching means operable in response to conditions appearing on said lines for transmitting tone signals characteristic of a condition on said lines in the backward direction towards the calling subscriber's lines, a supervisory device and means for connecting said supervisory device to the respective connecting line through said register, said last mentioned means being adapted to render inoperative said means for ordinary disconnection of the register so as to keep the register connected to the respective connecting line until completion of a talking connection, said supervisory device comprising first indicating switching means operating in response to switching signals caused by said controlling means and second indicating switching means operating in response to tone signals caused by said means operable in response to conditions appearing on said lines, said supervisory device further comprising recording means for permanently recording the settings of said first and second indicating switching means.

References Cited in the file of this patent
UNITED STATES PATENTS

| | | |
|---|---|---|
| 2,508,052 | Williford | May 16, 1950 |
| 2,585,904 | Busch | Feb. 19, 1952 |

UNITED STATES PATENT OFFICE
CERTIFICATE OF CORRECTION

Patent No. 2,873,322

February 10, 1959

Sten Daniel Vigren et al.

It is hereby certified that error appears in the printed specification of the above numbered patent requiring correction and that the said Letters Patent should read as corrected below.

Column 4, line 29, for "with" read -- within --; column 7, line 20, for "J15" read -- J5 --; column 33, line 36, for "caled" read -- called --.

Signed and sealed this 23rd day of June 1959.

(SEAL)
Attest:

KARL H. AXLINE
Attesting Officer

ROBERT C. WATSON
Commissioner of Patents